(12) United States Patent
Yoon et al.

(10) Patent No.: US 12,147,726 B2
(45) Date of Patent: Nov. 19, 2024

(54) ELECTRONIC DEVICE DISPLAYING WIDGET AND METHOD FOR CONTROLLING THE SAME

(71) Applicant: Samsung Electronics Co., Ltd., Gyeonggi-do (KR)

(72) Inventors: Youngmin Yoon, Gyeonggi-do (KR); Yunsung Choi, Gyeonggi-do (KR); Inyoung Choi, Gyeonggi-do (KR); Jinyung Jung, Gyeonggi-do (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/844,140

(22) Filed: Jun. 20, 2022

(65) Prior Publication Data

US 2023/0020913 A1 Jan. 19, 2023

Related U.S. Application Data

(63) Continuation of application No. PCT/KR2022/005501, filed on Apr. 15, 2022.

(30) Foreign Application Priority Data

Jul. 14, 2021 (KR) .......................... 10-2021-0092479

(51) Int. Cl.
*G06F 3/14* (2006.01)

(52) U.S. Cl.
CPC .................................. *G06F 3/1454* (2013.01)

(58) Field of Classification Search
CPC ...... G06F 3/1454; G06F 1/163; G06F 3/0481; H04M 1/724095; H04M 1/72412; G09G 5/14; G09G 2354/00
See application file for complete search history.

(56) References Cited

U.S. PATENT DOCUMENTS

| 9,648,099 | B2 * | 5/2017 | Lee | ............................ G06F 3/03 |
| 9,924,018 | B2 * | 3/2018 | Won | .................. H04M 1/72412 |
| 10,136,248 | B2 * | 11/2018 | Kwon | ...................... H04W 4/80 |

(Continued)

FOREIGN PATENT DOCUMENTS

| EP | 3139264 A2 | 3/2017 |
| KR | 10-2011-0123099 A | 11/2011 |

(Continued)

OTHER PUBLICATIONS

International Search Report dated Jul. 21, 2022.
Extended European Search Report dated Jul. 9, 2024.

*Primary Examiner* — Sahlu Okebato
(74) *Attorney, Agent, or Firm* — Cha & Reiter, LLC

(57) ABSTRACT

An electronic device and method are disclosed herein. The electronic device includes a memory, a display, and a processor. The processor implements the method, including: displaying, via the display, a first screen related to an external electronic device as a widget using at least a part of a display area of the display, detecting, via the processor, an event associated with at least one application capable of interoperating with the external electronic device, after detecting the event, obtaining a second screen related to the external electronic device, based at least on information related to the detected event, and removing display of the first screen and displaying the second screen on the display.

18 Claims, 23 Drawing Sheets

(56) References Cited

U.S. PATENT DOCUMENTS

| | | | |
|---|---|---|---|
| 2011/0276911 A1 | 11/2011 | Choi | |
| 2014/0344448 A1 | 11/2014 | Ha et al. | |
| 2015/0355816 A1* | 12/2015 | Shim | H04L 67/02 |
| | | | 715/745 |
| 2016/0036953 A1* | 2/2016 | Lee | H04M 1/05 |
| | | | 455/426.1 |
| 2016/0173679 A1 | 6/2016 | Ham et al. | |
| 2017/0011210 A1 | 1/2017 | Cheong et al. | |
| 2017/0060518 A1 | 3/2017 | Hong et al. | |
| 2017/0311025 A1 | 10/2017 | Kim et al. | |
| 2018/0067712 A1 | 3/2018 | Behzadi et al. | |
| 2018/0139318 A1 | 5/2018 | Choi | |
| 2018/0176632 A1* | 6/2018 | Yang | H04N 21/4122 |
| 2018/0267768 A1* | 9/2018 | Shin | G06F 3/048 |
| 2019/0303088 A1* | 10/2019 | Yuan | G06F 3/0482 |
| 2020/0333945 A1* | 10/2020 | Wilson | G06F 3/04883 |

FOREIGN PATENT DOCUMENTS

| | | |
|---|---|---|
| KR | 10-2016-0118000 A | 10/2016 |
| KR | 10-2017-0019910 A | 2/2017 |
| KR | 10-2017-0027435 A | 3/2017 |
| KR | 10-2017-0120977 A | 11/2017 |
| KR | 10-2018-0055364 A | 5/2018 |

* cited by examiner

ELECTRONIC DEVICE DISPLAYING WIDGET AND METHOD FOR CONTROLLING THE SAME

CROSS-REFERENCE TO RELATED APPLICATION(S)

This application is a Continuation of and based on and claims priority under 35 U.S.C. § 120 to PCT International Application No. PCT/KR2022/005501, which was filed on Apr. 15, 2022, and claims priority to Korean Patent Application No. 10-2021-0092479, filed on Jul. 14, 2021, in the Korean Intellectual Property Office, the disclosures of which are incorporated by reference herein their entirety.

BACKGROUND

Technical Field

Embodiments of the disclosure relate to interoperation between electronic devices, and, more particularly, to screen mirroring between two electronic devices.

Description of Related Art

In recent times, electronic devices have advanced so as to provide a diversity of services and functions. To increase the useability and convenience of these devices and to meet consumer demand, there has been an increase in the development of applications executable by the electronic devices.

Particularly, electronic devices now may interoperate with external electronic devices, such as wearable smart devices. For example, an electronic device and an external electronic device may be synchronized (e.g., paired), whereupon one or the other device may display or control some synchronized information or operation.

SUMMARY

When an electronic device and an external electronic device are synchronized or paired, but physically distant from one another, a user may not be able to view a screen of the external electronic device, which may hinder their usage of the device.

For these reasons, screen "mirroring" is often utilized, which duplicates a display of one device on another. Thus, in this case, the screen of the external electronic device may be duplicated for display on the electronic device.

A weakness in this solution is that typically, the mirrored screen is displayed only within a predetermined application (e.g., a mirroring application). Furthermore, when the predetermined application is executed for mirroring, the mirrored screen may occupy an entirety of the screen of the electronic device.

Accordingly, the present disclosure enables display of a mirrored screen of an external electronic device in the form of a widget, enabling information-display and control of the external electronic device in real-time.

According to an embodiment, an electronic device may include a memory, a display, at least one processor operatively connected to the memory and the display, wherein the at least one processor is configured to: display a first screen related to an external electronic device as a widget using at least part of a display area of the display, detect an event associated with at least one application capable of interoperating with the external electronic device, after detecting the event, obtain a second screen related to the external electronic device, based at least on information related to the detected event, and remove display of the first screen and display the second screen on the display.

According to an embodiment, a method for controlling an electronic device may include displaying, via a display, a first screen related to an external electronic device as a widget using at least a part of a display area of the display, detecting, via at least one processor, an event associated with at least one application capable of interoperating with the external electronic device, after detecting the event, obtaining a second screen related to the external electronic device, based at least on information related to the detected event, and removing display of the first screen and displaying the second screen on the display.

An electronic device, according to an embodiment of the disclosure, may display a mirrored screen of an external electronic device, allowing a user to control the external electronic device remotely via the local electronic device.

In addition, according to an embodiment, the local electronic device may simulate the experience of using and controlling the external electronic device, even when the external electronic device is not synchronized and/or paired.

DETAILED DESCRIPTION

Figure 1:
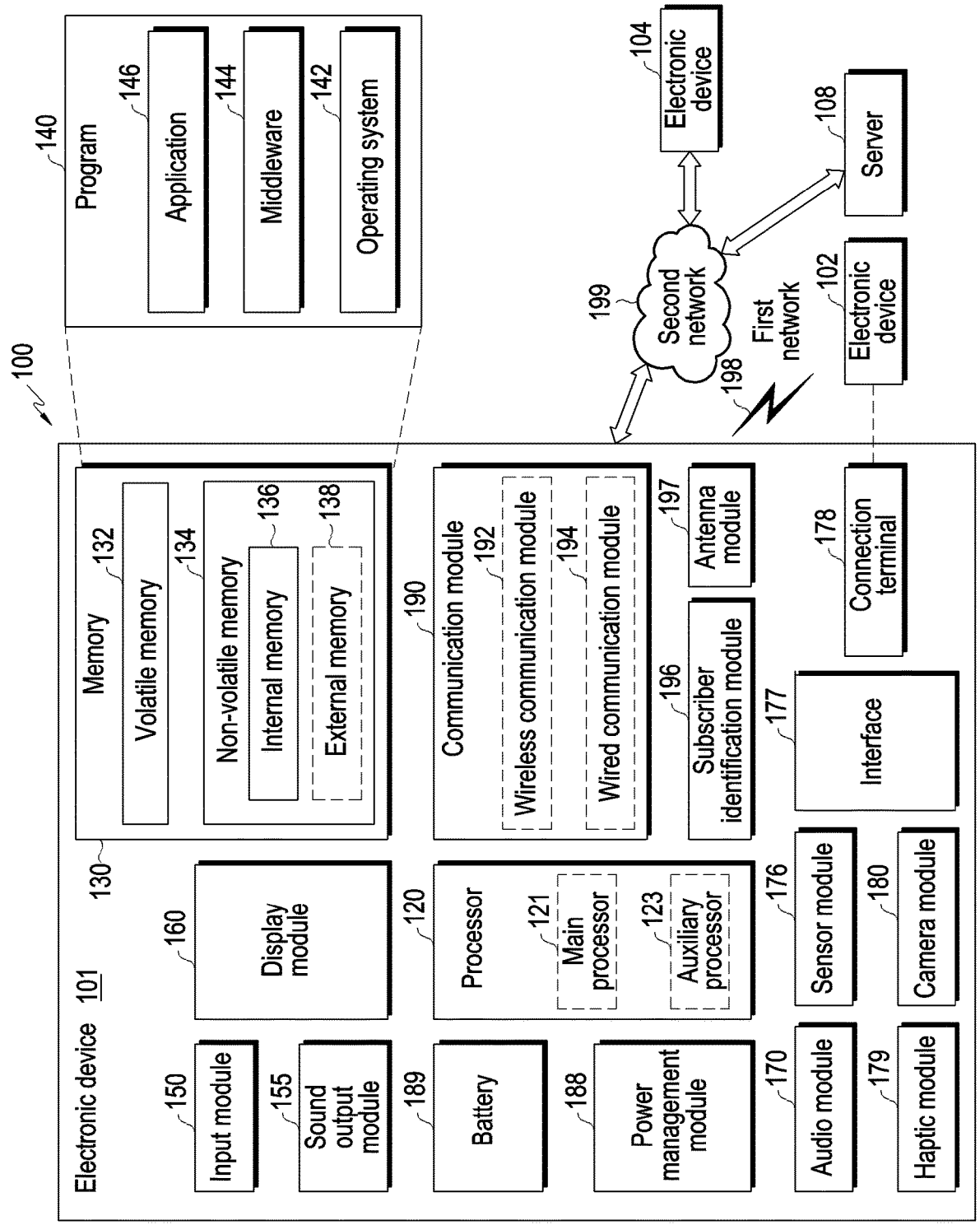
FIG. 1 is a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element implemented using a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to an embodiment, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
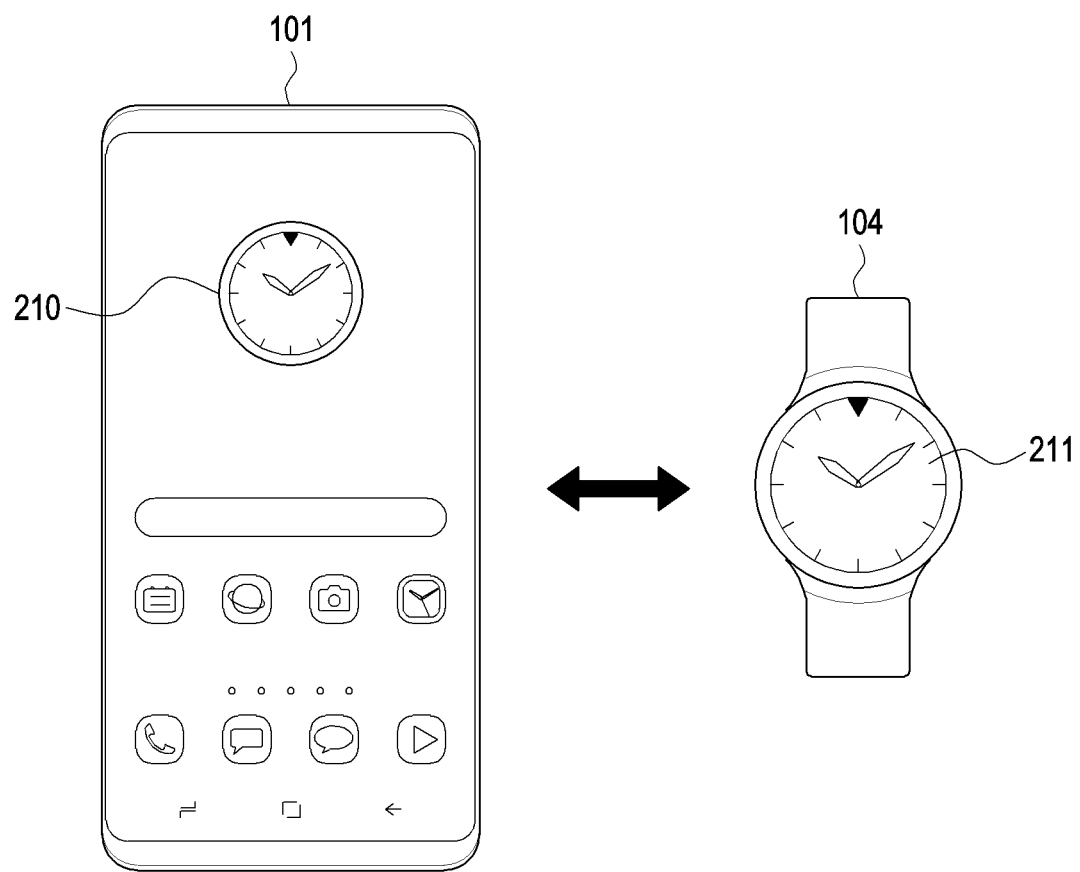
FIG. 2 is a diagram illustrating the type of a communication connection between an electronic device and an external electronic device according to an embodiment.

FIG. 2 is a diagram illustrating the type of a communication connection between an electronic device and an external electronic device according to an embodiment.

According to an embodiment, referring to FIG. 2, the electronic device 101 (e.g., the electronic device 101 of FIG. 1) may display a screen 210 related to the external electronic device 104 (e.g., the electronic device 104 of FIG. 1) in a partial area of a display (e.g., the display 160 of FIG. 1). According to an embodiment, the external electronic device 104 may include a wearable device (e.g., a smart watch, smart glasses, or a smart band).

For example, if the electronic device 101 is in communication with the external electronic device 104, the electronic device 101 may receive a transmission of at least one piece of information associated with a screen 211 of the external electronic device 104 (e.g., a mirrored screen display) from the external electronic device 104, and may display the screen 210 corresponding to the screen 211 of the external electronic device 104. For example, the information may include a design (e.g., a structure of the display of the external device, such as a shape thereof) and a content (e.g., the actual contents displayed on the external device at present).

According to an embodiment, based on the at least one piece of information related to the screen 211 of the external electronic device 104 received from the external electronic device 104 and information stored in the memory (e.g., the memory 130 of FIG. 1), the electronic device 101 may display a mirror image 210 of the screen 211 of the external electronic device 104.

Although FIG. 2 illustrates that the electronic device 101 is in communication with the external electronic device 104, the electronic device 101 may also display, the screen 210 of the external electronic device 104 when the electronic device 101 is not in communication with the external electronic device 104, based on the information stored in the memory (e.g., the memory 130 of FIG. 1), according to an embodiment.

According to an embodiment, the screen 210 related to the external electronic device 104 may be defined according to the physical shape of the display of the external electronic device 104. Thus, the circular watch screen for screen 211 may be reproduced as circular in the mirroring screen 210.

Although FIG. 2 illustrates that the screen 210 related to the external electronic device 104 includes a single area that is based on the shape of the display of the external electronic device 104, the screen 210 related to the external electronic device 104 may include a plurality of areas based on the shape of the display of the external electronic device 104 according to an embodiment.

According to an embodiment, if the screen 210 related to the external electronic device 104 includes a plurality of areas, the screen 210 related to the external electronic device 104 may include a first area that is a screen corresponding to a home screen of the external electronic device 104 and is maintained irrespective of the occurrence of an event, and a second area including a screen that is changed based on the occurrence of an event. The case in which the screen 210 related to the external electronic device 104 includes a plurality of areas according to an embodiment will be described with reference to FIGS. 11A to 12B.

Figure 3:
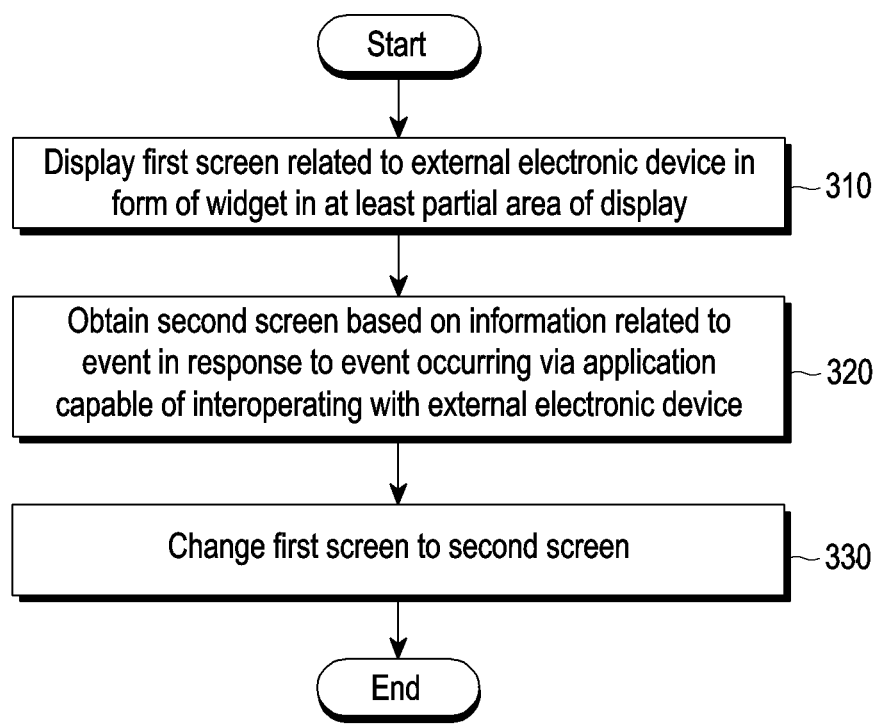
FIG. 3 is a flowchart illustrating an operation of displaying a widget by an electronic device according to an embodiment.

FIG. 3 is a flowchart illustrating an operation of displaying a widget by an electronic device according to an embodiment.

According to an embodiment, referring to FIG. 3, in operation 310, an electronic device (e.g., the electronic device 101 of FIG. 1, the processor 120 of FIG. 1, or the electronic device 101 of FIG. 2) may display a first screen mirroring a screen of an external electronic device in at least a partial area of a display (e.g., the display 160 of FIG. 1).

According to an embodiment, the electronic device may receive a transmission of information related to the screen of the external electronic device (e.g., the electronic device 104 of FIG. 1 or the external electronic device 104 of FIG. 2) from the external electronic device, and may obtain the first screen (e.g., the mirror) for displaying based on the received information. For example, the information associated with the screen of the external electronic device may include design and/or content information of the screen of the external electronic device (e.g., a display's physical shape and/or actual present displayed content).

For example, the electronic device may receive the information related to a home screen of the external electronic device from the external electronic device, and may obtain the first screen based on the received information related to the home screen. According to an embodiment, an operation in which the electronic device displays the first screen including information related to the home screen of the external electronic device will be described with reference to FIG. 4A.

According to an embodiment, the electronic device may display a screen related to the external electronic device in the form of a widget in a home screen or a lock screen of the electronic device.

According to an embodiment, the electronic device may display the screen related to the external electronic device in the form of a widget, and if receiving a user input that selects the widget, may display an application execution screen related to the widget.

According to an embodiment, an embodiment that displays a screen related to the external electronic device in the form of a widget in the home screen of the electronic device will be described with reference to FIGS. 4A and 4B. According to an embodiment, an operation of displaying a screen related to the external electronic device in the form of a widget in the lock screen of the electronic device will be described with reference to FIGS. 10A and 10B.

According to an embodiment, the electronic device may display a screen related to the external electronic device in the form of a popup. For example, the electronic device may display a screen related to the external electronic device in the form of a popup in a part of an application execution screen of the electronic device. According to an embodiment, the operation of displaying a screen related to the external electronic device in the form of a popup will be described with reference to FIG. 14.

According to an embodiment, the information related to the design of a home screen of the external electronic device may be received from the external electronic device, or may be downloaded from an external server. According to an embodiment, an embodiment of downloading information related to the design of a home screen from the external server will be described with reference to FIGS. 13A to 13C.

According to an embodiment, the first screen may include a single area related to the home screen of the external electronic device, or may include a plurality of areas including the single area related to the home screen and another area related to occurrence of an event.

According to an embodiment, if the first screen includes a plurality of areas, the first screen may include a first area that is a screen corresponding to the home screen of the external electronic device and is maintained irrespective of occurrence of an event, and a second area including a screen that is changed based on the occurrence of an event. According to an embodiment, the second area may be a screen set by a user, or may be a screen related to an event that previously occurred. According to an embodiment, an operation in which an electronic device displays the first screen including a plurality of areas will be described with reference to FIGS. 11A to 12B.

According to an embodiment, in operation 320, an event may be detected via or in relation to at least one application capable of interoperating with an external electronic device (e.g., the electronic device 104 of FIG. 1 or the external electronic device 104 of FIG. 2) from among a plurality of applications stored in a memory (e.g., the memory 130 of FIG. 1). Accordingly, the electronic device may obtain(e.g., receive) a second screen based on information related to the detected event.

According to an embodiment, the electronic device may detected occurrence of the event if receiving information indicating the same from the external electronic device. For example, if the electronic device receives information related to at least one application from the external electronic device, the electronic device may identify that the event is detected. According to an embodiment, if the electronic device receives, from the external electronic device, information related to an application different from the plurality of applications stored in the memory of the electronic device, the electronic device may identify that an event occurs.

According to an embodiment, if the electronic device identifies that an event occurs based on reception of information related to at least one application from the external electronic device, the electronic device may obtain the second screen based on the information related to the at least one application received from the external electronic device and the information stored in the memory (e.g., the memory 130 of FIG. 1) of the electronic device.

According to an embodiment, if the electronic device identifies that an event occurs based on reception of information related to an application different form the plurality of applications stored in the memory of the electronic device from the external electronic device, the electronic device may obtain the second screen based on the received information related to the different application and the information stored in the memory. According to an embodiment, the operation of obtaining the second screen based on the information received from the external electronic device will be described with reference to FIGS. 5A and 5B.

According to an embodiment, if information related to an event is obtained via at least one application capable of interoperating with the external electronic device, the electronic device may obtain the second screen based on the information related to the event. For example, if information (e.g., weather information, location information, time information, schedule information, or information associated with reception of a new message) related to an event of at least one application capable of interoperating with the external electronic device is obtained via an external server that is different from the external electronic device, via the memory of the electronic device, or via a sensor (e.g., the sensor module 176 of FIG. 1) included in the electronic device, the electronic device may obtain the second screen based on the information related to the event. According to an embodiment, the electronic device may obtain the second screen based on the obtained information related to the event and the information stored in the memory of the electronic device.

According to an embodiment, if information related to an event of at least one application capable of interoperating with the external electronic device is obtained via the external server that is different from the external electronic device, via the memory of the electronic device, or via a sensor included in the electronic device, the electronic device may transmit the obtained information related to the event to the external electronic device. Through the above, the external electronic device may also synchronize and display the information associated with the event occurring via an application that is stored in the electronic device. According to an embodiment, the operation of obtaining a second screen based on obtained information by the electronic device will be described with reference to FIGS. 6A and 6C.

According to an embodiment, if the first screen includes a single area related to a home screen of the external electronic device, the second screen may include a single area related to an event.

According to an embodiment, if the first screen includes a plurality of areas including a single area related to a home screen of the external electronic device and another area related to the occurrence of an event, the second screen may include a first area including a screen corresponding to a home screen of the external electronic device and a second area including a screen produced as an event occurs.

According to an embodiment, the first screen or the second screen displayed in the form of a widget may include at least one user interface related to at least one application capable of interoperating with the external electronic device.

According to an embodiment, if the electronic device receives a user input that selects one of the at least one user interface, the electronic device may identify that an event occurs, may obtain the execution screen of an application related to the selected user interface, and may display the same in the form of a widget. According to an embodiment, the operation in which the first screen or the second screen includes a user interface will be described with reference to FIGS. 8 to 9B.

According to an embodiment, if the first screen or the second screen includes a plurality of areas, at least one user interface may be included in a first area or a second area, and an execution screen based on a user input may be displayed in the second area. According to an embodiment, the operation in which the first screen or the second screen including a plurality of areas includes a user interface will be described with reference to FIGS. 12A and FIG. 12B.

According to an embodiment, the electronic device may transmit a control command to the external electronic device so that the external electronic device displays the execution screen of the application related to the selected user interface.

According to an embodiment, in operation 330, the electronic device may change the first screen to the second screen.

According to an embodiment, if the first screen includes a single area related to a home screen of the external electronic device, the electronic device may change the first screen to the second screen.

According to an embodiment, if the first screen includes a plurality of areas including a single area related to the home screen of the external electronic device and another area related to the occurrence of an event, the electronic device may change the first screen to the second screen including a first area that is a screen related to the home screen of the external electronic device and a second area that is a screen produced as an event occurs. Accordingly, the electronic device may provide an experience of changing the screen of the second area is changed as the event occurs.

According to an embodiment, in the case in which the electronic device is configured to provide a notification (e.g., a popup or a notification bar) when information related to an event of at least one application capable of interoperating with the external electronic device is obtained via an external server, the memory of the electronic device, or a sensor included in the electronic device, the electronic device may not provide a notification even when information related to an event is obtained if the screen related to the external electronic device is displayed in the form of a widget in a partial area of the display (e.g., the display module 160 of FIG. 1).

According to an embodiment, in the state in which communication with the external electronic device is connected, if communication with the external electronic device is disconnected, the electronic device may obtain a third screen based on the information stored in the memory. For example, in the state in which the second screen including information associated with an application stored in the external electronic device is displayed in the form of a widget, if communication with the external electronic device is disconnected, the electronic device may obtain the third screen based on information associated with an application that is most similar to the application of the external electronic device in the second screen among the plurality of applications stored in the electronic device. According to an embodiment, in the state in which the second screen including information (e.g., heart rate) obtained via a sensor (e.g., a heart rate measurement sensor) included in the external electronic device is displayed in the form of a widget, if communication with the external electronic device is disconnected, the electronic device may obtain the third screen based on information (e.g., step count) obtained via a sensor (e.g., a gyro sensor or an acceleration sensor) included in the electronic device.

According to an embodiment, the electronic device may change the second screen to the third screen. According to an embodiment, an operation of the electronic device performed depending on whether communication between the electronic device and the external electronic device is connected will be described with reference to FIGS. 7A to 7C.

According to an embodiment, if communication with the external electronic device is reconnected, the electronic device may transmit a control command to the external electronic device so that the external electronic device displays a screen corresponding to the third screen. According to an embodiment, if communication with the external electronic device is reconnected, the electronic device may obtain a fourth screen based on information received from the external electronic device upon reconnection and may change the third screen to the fourth screen. Accordingly, a screen displayed in the display of the external electronic device and the screen displayed in the form of a widget in the electronic device may be synchronized after the communication between the electronic device and the external electronic device is reconnected.

Figure 4A:
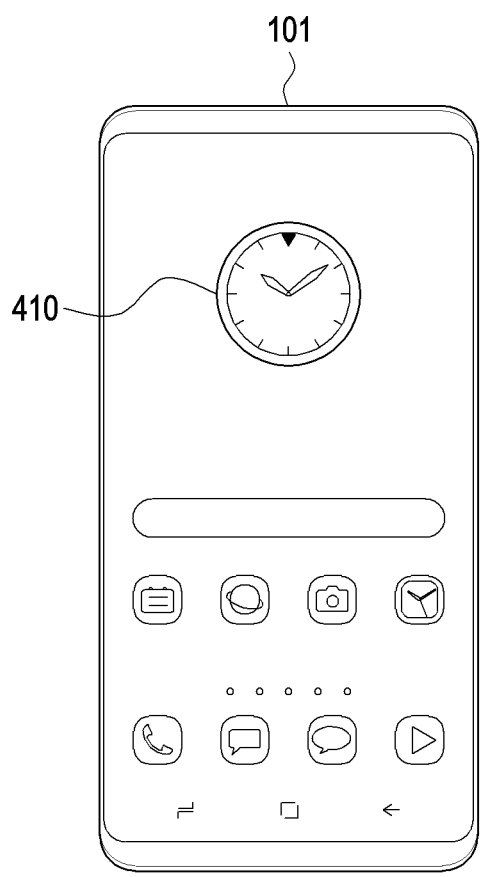
FIG. 4A is a diagram illustrating an operation of displaying a widget by an electronic device according to an embodiment.

FIG. 4A is a diagram illustrating an operation of displaying a widget by an electronic device according to an embodiment.

According to an embodiment, referring to FIG. 4A, the electronic device 101 (e.g., the electronic device 101 of FIG. 1, the processor 120 of FIG. 1, or the electronic device 101 of FIG. 2) may display a screen 410 related to an external electronic device (e.g., the electronic device 104 of FIG. 1 or the external electronic device 104 of FIG. 2) in the form of a widget in a partial area of a display (e.g., the display module 160 of FIG. 1).

For example, if a user configures the home screen to display an external electronic device's screen 410 as a widget on the home screen, the electronic device 101 may display a mirrored screen of the external electronic device (e.g., a smartwatch) in the form of a widget. The widget including the mirrored screen 410 may include a silhouette that is based on a shape of a display of the external electronic device. According to an embodiment, although the screen 410 related to the external electronic device is illustrated as having a circular shape in FIG. 4A (e.g., so as to correspond to a smartwatch display), it is not limited thereto.

According to an embodiment, the screen 410 related to the external electronic device may be obtained based on information related to a home screen of the external electronic device. For example, if communication with the external electronic device is connected, the screen 410 related to the external electronic device may be obtained based on information associated with the home screen of the external electronic device received from the external electronic device.

According to an embodiment, the electronic device 101 may obtain the screen 410 related to the external electronic device based on information that the electronic device 101 obtains and at least one piece of information among information related to the design of the home screen or content information received from the external electronic device. For example, if the screen 410 related to the external electronic device is a clock screen, the electronic device 101 may obtain the screen 410 related to the external electronic device based on the information related to the design of the home screen of the external electronic device and time information that the electronic device 101 obtains.

According to an embodiment, the screen 410 related to the external electronic device may be designated by a user if communication with the external electronic device is not connected, or may be downloaded from an external server.

Figure 4B:
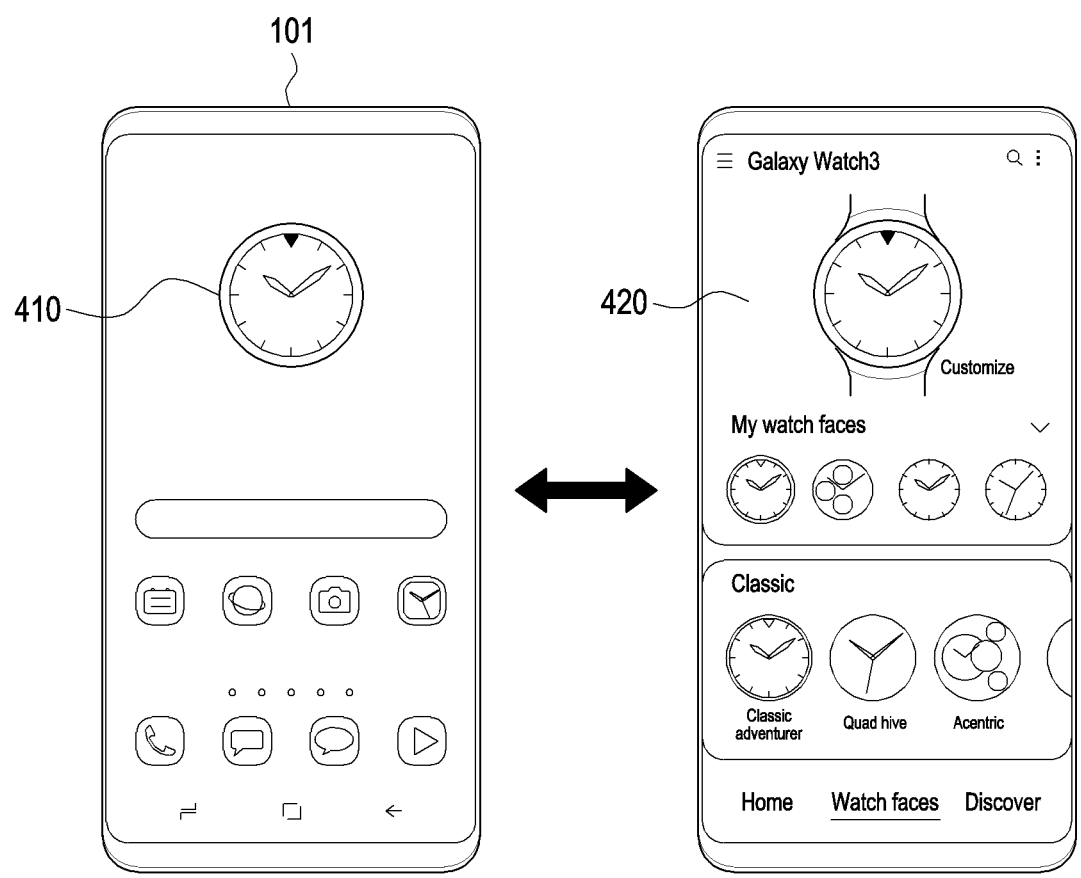
FIG. 4B is a diagram illustrating an operation of displaying a widget by an electronic device according to an embodiment.

FIG. 4B is a diagram illustrating an operation of displaying a widget by an electronic device according to an embodiment.

According to an embodiment, referring to FIG. 4B, if a user selects the mirrored screen 410 which reproduces the display of the external electronic device as a widget (e.g., the electronic device 104 of FIG. 1 or the external electronic device 104 of FIG. 2), the electronic device 101 (e.g., the electronic device 101 of FIG. 1, the processor 120 of FIG. 1, or the electronic device 101 of FIG. 2) may change to display of an execution screen 420 of an application related to the mirrored screen 410. For example, if the mirrored screen 410 includes a clock-based display screen, and a selection of the same is detected, the electronic device 101 may change to display of the execution screen 420. The execution screen 420 may be part an application capable of changing settings for the clock screen.

Figure 5A:
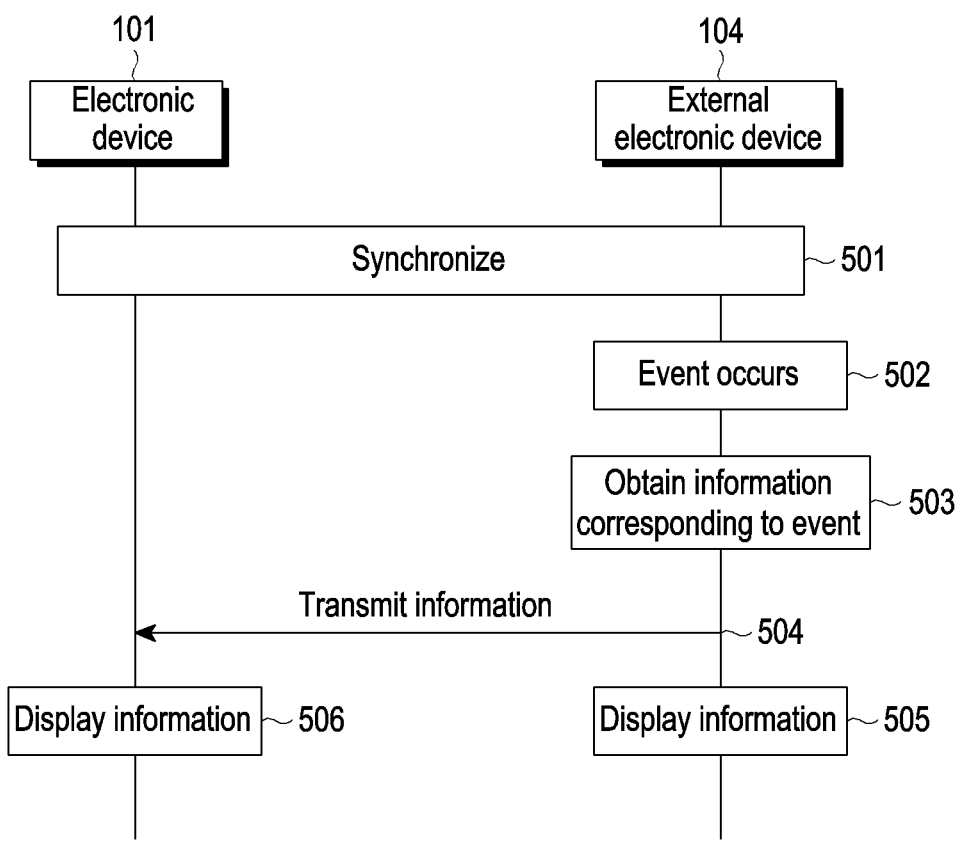
FIG. 5A is a diagram illustrating an operation of changing, based on information associated with an external electronic device, the screens of an electronic device and the external electronic device according to an embodiment.

FIG. 5A is a diagram illustrating an operation of changing, based on information associated with an external electronic device, the screens of an electronic device and the external electronic device according to an embodiment.

According to an embodiment, referring to FIG. 5A, in operation 501, the electronic device 101 (e.g., the electronic device 101 of FIG. 1, the processor 120 of FIG. 1, or the electronic device 101 of FIG. 2) may synchronize (e.g., pair) with an external electronic device (e.g., the electronic device 104 of FIG. 1 or the external electronic device 104 of FIG. 2) and display a mirrored screen (as in 510 of FIG. 5B) of the same, in the form of a widget. For example, if the electronic device 101 is connected to the external electronic device 104 for communication (e.g., paired) and a user configures the home screen of the electronic device 101 to include a widget mirroring a display screen of the external electronic device 104, the electronic device 101 may receive the screen information from the external electronic device 104, and display, based on the received screen information, a mirror screen 510 related to the external electronic device 104. Furthermore, the mirror screen 510 may include a silhouette or shape of a physical display of the external electronic device 104.

According to an embodiment, in operation 502, the external electronic device 104 may detect the occurrence of an event. For example, the external electronic device 104 may detect that an event that occurs via or within at least one of a plurality of stored applications.

According to an embodiment, if certain information is received from an external server via an application, if a preset time corresponding to schedule information stored in an application arrives, or if certain information is obtained via a sensor included in the external electronic device 104 related to an application, the external electronic device 104 may identify that an event has occurred, via the corresponding application.

According to an embodiment, in operation 503, the external electronic device 104 may obtain information corresponding to the event. For example, the external electronic device 104 may obtain, as the information corresponding to the event, information obtained via the external server (e.g., new message information, weather information, or time information that changes in association with entry into another country), information obtained from the memory of the external electronic device (e.g., notification information) or information obtained via a sensor included in the external electronic device 104 (e.g., biometric information (e.g., heart rate, step count) GPS information).

According to an embodiment, in operation 504, the external electronic device 104 may transmit the information corresponding to the detected event to the electronic device 101.

According to an embodiment, in operation 505, the external electronic device 104 may display the information corresponding to the detected event. For example, the external electronic device 104 may display the execution screen of an application that is executed accordingly to the information corresponding to the detected event, and may change the home screen displayed thereon to the execution screen of the new application.

According to an embodiment, although it is illustrated that operation 505 is performed after operation 504 in FIG. 5A, operation 504 and at least a part of operation 505 may be performed in parallel in actual implementation.

According to an embodiment, in operation 506, the electronic device 101 may display the information corresponding to the event, that is received from the external electronic device 104. For example, based on the information corresponding to the event received from the external electronic device 104, the electronic device 101 may obtain(e.g., receive) an execution screen of an application in which the detected event occurs. According to an embodiment, the execution screen of the application may be generated in the shape of the physical display of the external electronic device 104, and may correspond to the application execution screen displayed in the external electronic device 104 in operation 505.

Figure 5B:
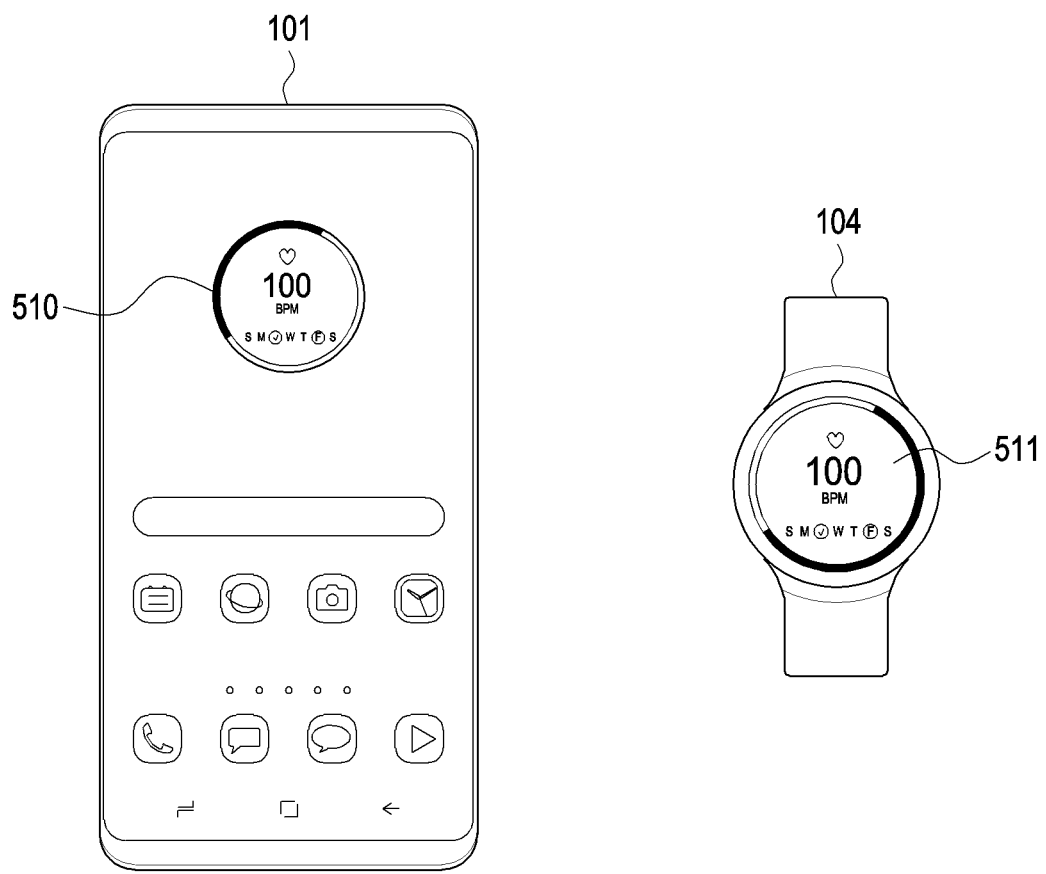
FIG. 5B is a diagram illustrating an electronic device and an external electronic device of which the screens are changed according to an embodiment.

According to an embodiment, based on the information corresponding to the event received from the external electronic device 104 and information that the electronic device 101 obtains, the electronic device 101 may obtain the execution screen of an application where the event occurs. For example, if the information corresponding to the event is received from the external electronic device 104, the electronic device 101 may obtain information related to an event of at least one application that is capable of interoperating with the external electronic device (e.g., weather information, location information, time information, schedule information, or information associated with reception of a new message) via an external server that is different from the external electronic device 104, the memory (e.g., the memory 130 of FIG. 1) of the electronic device 101, or a sensor (e.g., the sensor module 176 of FIG. 1) included in the electronic device 101, and may obtain, based on the information received from the external electronic device 104 and the information that the electronic device 101 obtains, the execution screen of the application where the event occurs. FIG. 5B is a diagram illustrating an electronic device and an external electronic device of which the screens are changed according to an embodiment.

According to an embodiment, referring to FIG. 5B, based on information related to an event that is received from the external electronic device 104 (e.g., the electronic device 104 of FIG. 1 or the external electronic device 104 of FIG. 2), the electronic device 101 (e.g., the electronic device 101 of FIG. 1, the processor 120 of FIG. 1, or the electronic device 101 of FIG. 2) may display, in the form of a widget, an application execution screen 510 that corresponds to an application execution screen 511 displayed in the external electronic device 104.

For example, the external electronic device 104 may display the application execution screen 511 (e.g., a health care application) including display information (e.g., heart rate information) that is obtained via a sensor included in the external electronic device 104, and the local electronic device 101 may display a mirroring screen of the same, based on information received from the external electronic device 104, in the form of the application execution screen 510 (e.g., a health care application) via a widget, thus reproducing the health care application, BPM information, and the circular smartwatch display on the local electronic device 101, as seen in FIG. 5B.

According to an embodiment, the electronic device 101 may display the application execution screen 510, in the form of a widget, that is obtained using the information related to the event received from the external electronic device 104 and the information stored in the electronic device 101 (e.g., time information or weather information received from the external server, or schedule information stored in a memory).

As described above, the electronic device 101 displays, in the form of a widget, a screen that is related to the external electronic device 104 and is in the shape of the display of the external electronic device 104, thereby providing an experience of using the external electronic device 104 via the electronic device 101.

Figure 6A:
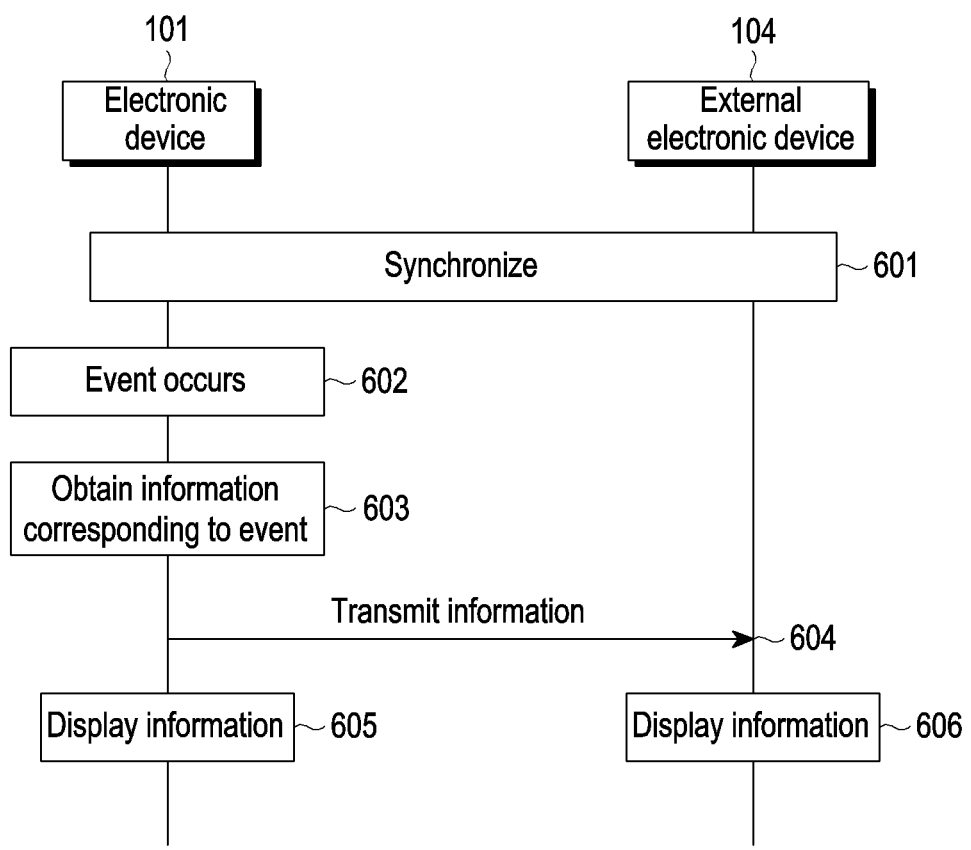
FIG. 6A is a diagram illustrating an operation of changing, based on information associated with an electronic device, the screens of the electronic device and an external electronic device according to an embodiment.

FIG. 6A is a diagram illustrating an operation of changing, based on information associated with an electronic device, screens of the electronic device and an external electronic device according to an embodiment.

According to an embodiment, referring to FIG. 6A, in operation 601, the electronic device 101 (e.g., the electronic device 101 of FIG. 1, the processor 120 of FIG. 1, or the electronic device 101 of FIG. 2) may synchronize with a screen of an external electronic device (e.g., the electronic device 104 of FIG. 1 or the external electronic device 104 of FIG. 2). For example, the electronic device 101 may be communicatively connected (e.g., paired) to the external electronic device 104. A user may configure the electronic device 101 to display a screen mirroring the display of the external electronic device 104 as a widget. Accordingly, the electronic device 101 may display, based on reception of information associated with the screen displayed by the external electronic device 104, a mirror screen of the external electronic device 104, in the shape of a physical display of the external electronic device 104.

According to an embodiment, in operation 602, the electronic device 101 may detect occurrence of a predefined event. For example, the predefined event may include some action or execution or selection, that is executed within or related to an application capable of interoperating with the external electronic device 104, from among a plurality of stored applications.

According to an embodiment, the predefined event may include detecting reception of certain information from an external server via the application, arrival of a time corresponding to a scheduled event stored in an application, or reception of certain information as detected via a sensor included in the electronic device 101 whose operations are related to the application.

According to an embodiment, in operation 603, the electronic device 101 may obtain, receive or retrieve information corresponding to the detected event. For example, the electronic device 101 may obtain, as information corresponding to the event, information from the external server (e.g., a new message, a current weather, or a time change associated with entry into a new time-zone during travel to another country), information obtained from the memory of the external electronic device (e.g., a notification information), or information obtained via a sensor included in the electronic device 101 (e.g., biometric information, such as a heart rate, step count, or location information such as GPS information).

According to an embodiment, in operation 604, the electronic device 101 may transmit the information corresponding to the event to the external electronic device 104.

According to an embodiment, in operation 605, the electronic device 101 may display the information corresponding to the event. For example, based on the information corresponding to the event, the electronic device 101 may produce an application execution screen in the shape of the display of the external electronic device 104, and may change a screen corresponding to the home screen of the external electronic device 104 displayed in the form of a widget in a part of a display (e.g., the display module 160 of FIG. 1) to the application execution screen.

According to an embodiment, although it is illustrated that operation 604 is performed after operation 605 in FIG. 6A, operation 604 and at least a part of operation 605 may be performed in parallel in actual implementation.

According to an embodiment, in operation 606, the external electronic device 104 may display the information corresponding to the event received from the electronic device 101. For example, based on the information corresponding to the event received from the electronic device 101, the external electronic device 101 may obtain the execution screen of an application where the event occurs. According to an embodiment, the application execution screen displayed in the external electronic device 104 may correspond to the application execution screen displayed in the electronic device 101 in operation 605.

Figure 6B:
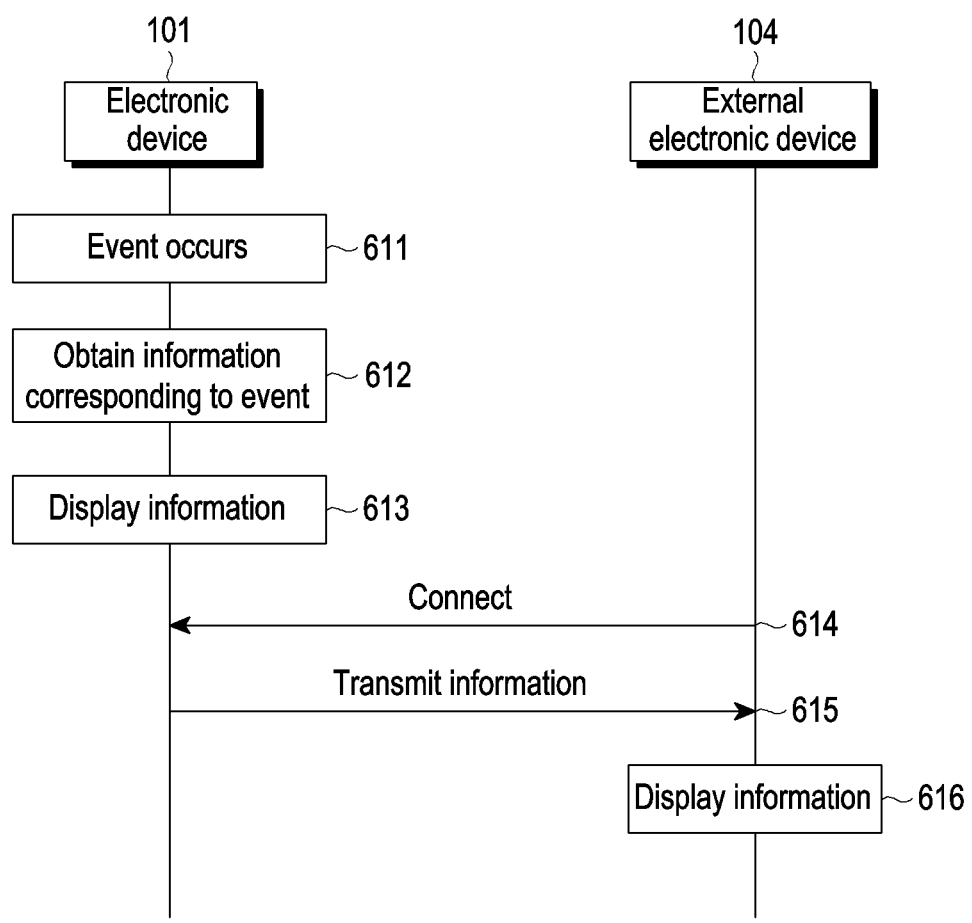
FIG. 6B is a diagram illustrating an operation of changing, based on obtained information associated with an electronic device, the screens of the electronic device and an external electronic device when the external electronic device and the electronic device are not connected according to an embodiment.

FIG. 6B is a diagram illustrating an operation of changing, based on obtained information associated with an electronic device, the screens of the electronic device and an external electronic device when the external electronic device and the electronic device are not connected according to an embodiment.

According to an embodiment, referring to FIG. 6B, in operation 611, the electronic device 101 (e.g., the electronic device 101 of FIG. 1, the processor 120 of FIG. 1, or the electronic device 101 of FIG. 2) may identify the occurrence of a predefined event. For example, the electronic device 101 may identify an event that occurs via at least one application capable of interoperating with the external electronic device 104 among a plurality of stored applications.

According to an embodiment, the predefined event may include reception of certain information from an external server via an application, arrival of a time corresponding to a scheduled event stored in an application, or receiving certain information via a sensor included in the electronic device 101 related to an application.

According to an embodiment, in operation 612, the electronic device 101 may obtain information corresponding to the detected event. For example, the electronic device 101 may obtain information from an external server (e.g., new message, weather information, or time change in association with entry into another country), information obtained from the memory of the external electronic device (e.g., a notification), or information obtained via a sensor included in the electronic device 101 (e.g., biometric information, such as heart rate, step count, or location information such as GPS information).

According to an embodiment, in operation 613, the electronic device 101 may display the information corresponding to the detected event. For example, based on the information corresponding to the event, the electronic device 101 may generate an application execution screen in form of a widget having a shape (e.g., silhouette) of the physical display of the external electronic device 104, and may change a home screen of the external electronic device 104 displayed within the widget in a part of a display (e.g., the display module 160 of FIG. 1) to the application execution screen in form of a widget.

According to an embodiment, in operation 614, communication between the electronic device 101 and the external electronic device 104 may be established.

According to an embodiment, in operation 615, the electronic device 101 may transmit the information corresponding to the detected event to the external electronic device 104.

According to an embodiment, in operation 616, the external electronic device 104 may generate and display a display screen based on the information corresponding to the event received from the electronic device 101. For example, based on the information corresponding to the event received from the electronic device 101, the external electronic device 101 may obtain(e.g., receive) the execution screen of the application in which the event occurs, and display the same. According to an embodiment, the application execution screen displayed in the external electronic device 104 may now correspond to the application execution screen displayed in widget of the electronic device 101, as displayed in operation 613.

Accordingly, even in the state in which the electronic device 101 and the external electronic device 104 are not communicatively connected, the electronic device 101 may simulate the experience of using the external electronic device 104 via the electronic device 101, and when the electronic device 101 establishes connection to the external electronic device 104, the electronic device 101 may synchronize with the application execution screen displayed in the electronic device 101 and may display the application execution screen in the external electronic device 104, to enable a seamless transition in user experience for users.

Figure 6C:
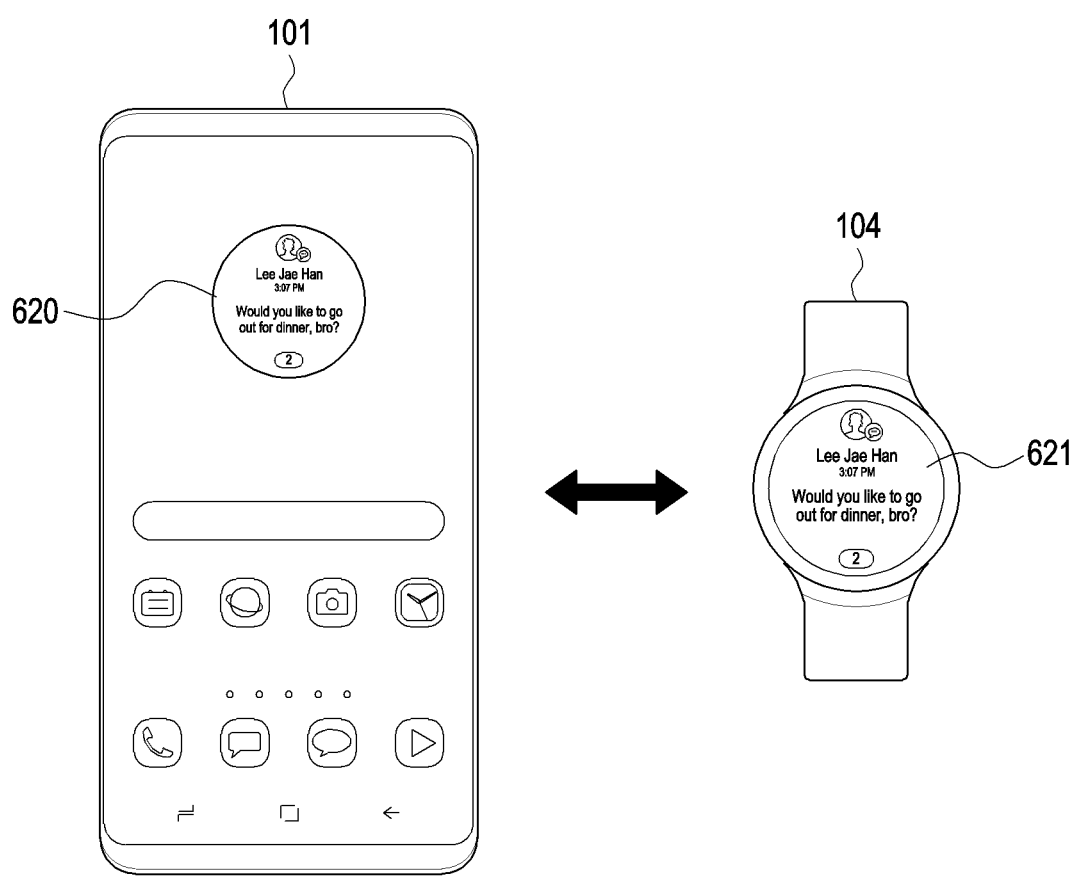
FIG. 6C is a diagram illustrating an electronic device and an external electronic device of which the screens are changed according to an embodiment.

FIG. 6C is a diagram illustrating an electronic device and an external electronic device of which the screens are changed according to an embodiment.

According to an embodiment, referring to FIG. 6C, the external electronic device 104 (e.g., the electronic device 104 of FIG. 1 or the external electronic device 104 of FIG. 2) may display, based on information related to a detected event received from the electronic device 101 (e.g., the electronic device 101 of FIG. 1, the processor 120 of FIG. 1, or the electronic device 101 of FIG. 2), an application execution screen 621 corresponding to an application execution screen 620 displayed in the form of a widget in the electronic device 101.

For example, the electronic device 101 may display, in the form of a widget, the application execution screen 620 (e.g., a message application) that includes information (e.g., new message reception information) received from an external server. The widget may be displayed in the shape of a physical display of the external electronic device 104, and the external electronic device 104 may display the application execution screen 621 (e.g., a message application) based on the information received from the electronic device 101, corresponding to the contents of the widget 620.

As described above, as the mirror display image 620 takes the form of a widget, includes displaying a screen that corresponding to that of the external electronic device 104 and is generated in the shape of the physical display of the external electronic device 104, this may provide a user with an experience of using the external electronic device 104 via the local electronic device 101.

Figure 7A:
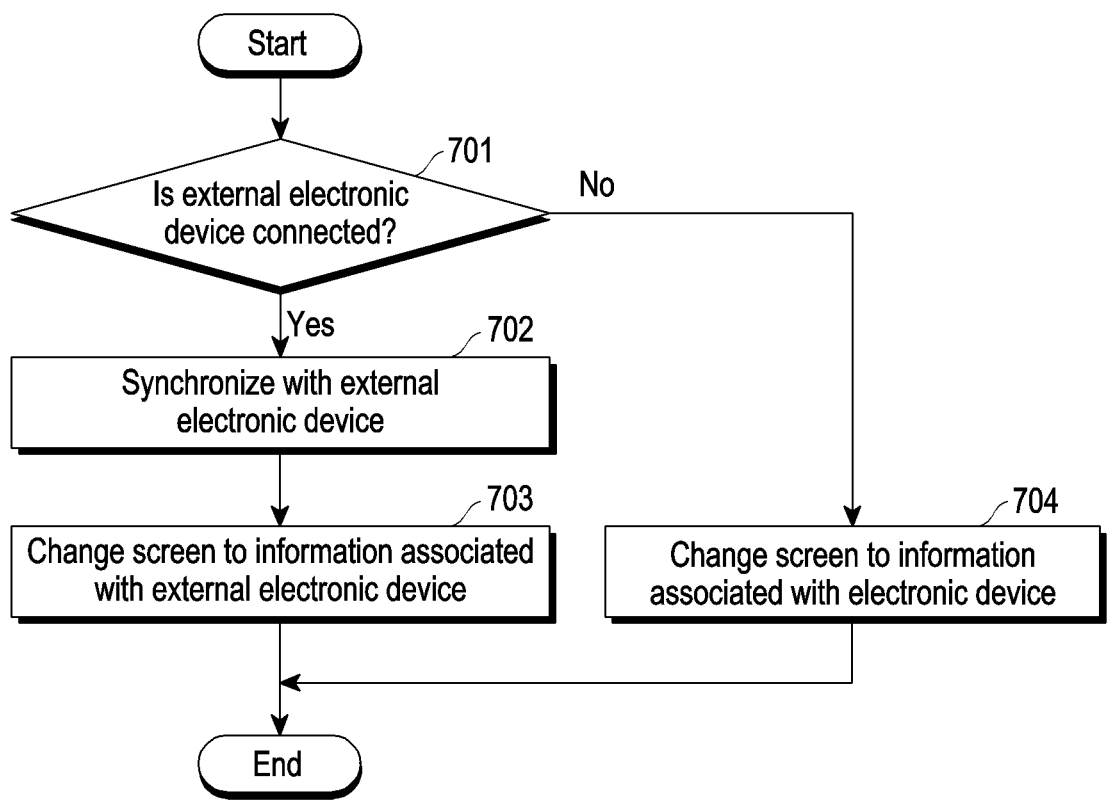
FIG. 7A is a diagram illustrating an operation of an electronic device performed depending on whether an external electronic device is connected according to an embodiment.

FIG. 7A is a diagram illustrating an operation of an electronic device performed depending on whether an external electronic device is connected according to an embodiment.

According to an embodiment, in operation 701, an electronic device (e.g., the electronic device 101 of FIG. 1, the processor 120 of FIG. 1, or the electronic device 101 of FIG. 2) may identify whether an external electronic device (e.g., the electronic device 104 of FIG. 1 or the external electronic device 104 of FIG. 2) is communicatively connected to the electronic device. For example, the operation of identifying whether the external electronic device is connected may be performed at the initial connection to the external electronic device, or may be performed in the state in which the electronic device and the external electronic device are connected. For example, while the electronic device is displaying a screen based on information received from the external electronic device in the state of being connected to the external electronic device, the electronic device may identify whether the external electronic device is connected to the electronic device.

According to an embodiment, if the electronic device and the external electronic device are communicatively connected ("Yes" in operation 701), the electronic device may synchronize with the external electronic device in operation 702. For example, based on information associated with a home screen received from the external electronic device, the electronic device may display, in the form of a widget, a mirror screen reproducing the display screen of the external electronic device. The widget may have a silhouette/shape matching the silhouette/shape of the display of the external electronic device.

Figure 7B:
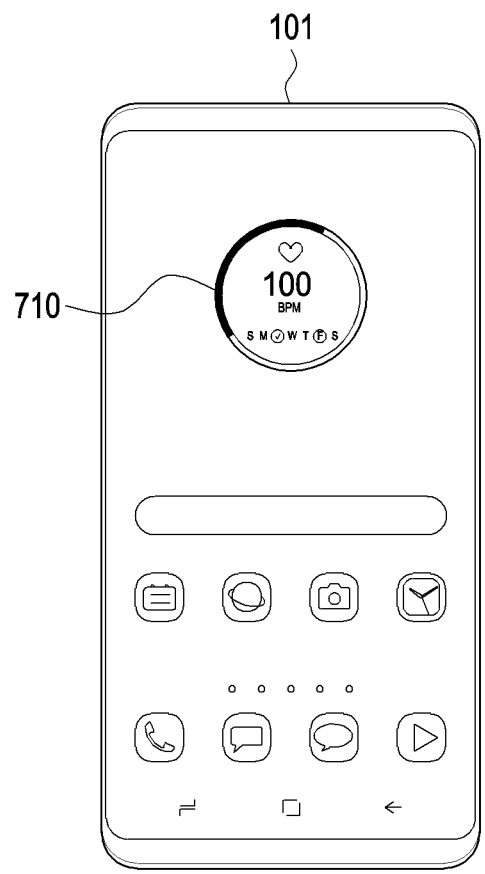
FIG. 7B is a diagram illustrating an operation of an electronic device when an external electronic device is connected according to an embodiment.

According to an embodiment, in operation 703, the electronic device may change a screen to the information associated with the external electronic device. For example, if receiving information associated with an event that occurs via an application from the external electronic device, the electronic device may obtain, based on the received information associated with the event, the execution screen of an application where the event occurs, and may change a screen corresponding to the home screen of the external electronic device to the obtained execution screen of the application, as illustrated in FIG. 7B. According to an embodiment, the execution screen of the application where the event occurs may be obtained based on the shape of the display of the external electronic device.

FIG. 7B is a diagram illustrating an operation of an electronic device when an external electronic device is connected according to an embodiment.

According to an embodiment, referring to FIG. 7B, if the electronic device 101 is communicatively connected to the external electronic device, and an event occurs via an application of the external electronic device, the electronic device 101 may produce, based on information (e.g., heart rate information) received from the external electronic device, an mirrored execution screen 710 of the application (e.g., a health care application) in which the event occurs.

According to an embodiment, the electronic device 101 may change the mirror screen corresponding to a home screen of the external electronic device to the obtained execution screen 710 of the application.

Figure 7C:
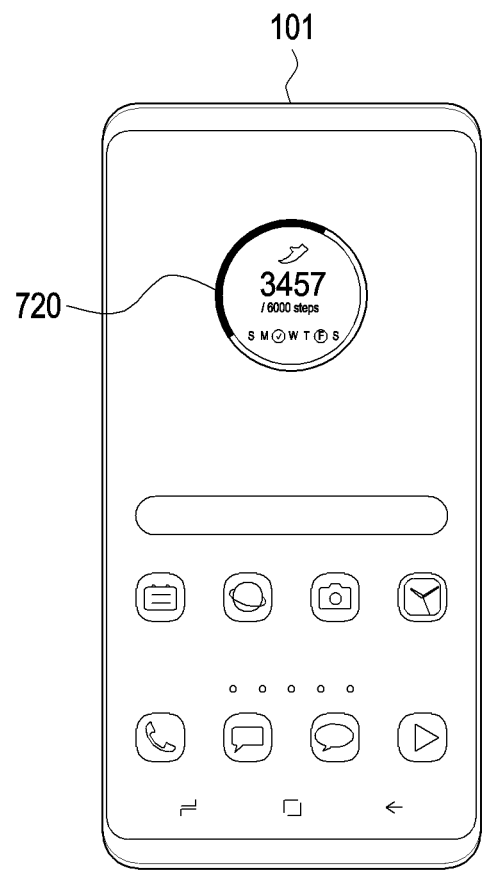
FIG. 7C is a diagram illustrating an operation of an electronic device when an external electronic device is not connected according to an embodiment.

According to an embodiment, referring again to FIG. 7A, if the electronic device is not connected to the external electronic device (No in operation 701), the electronic device may change a screen to information associated with the electronic device in operation 704. For example, if an event occurs via at least one application capable of interoperating with the external electronic device among a plurality of stored applications, the electronic device may obtain, based on information corresponding to the event that the electronic device obtains, the execution screen of the application where the event occurs, and may change a screen corresponding to the home screen of the external electronic device to the obtained execution screen of the application as illustrated in FIG. 7C. According to an embodiment, the execution screen of the application where the event occurs may be obtained based on the shape of the display of the external electronic device.

FIG. 7C is a diagram illustrating an operation of an electronic device when an external electronic device is not connected according to an embodiment.

According to an embodiment, referring to FIG. 7C, if the electronic device 101 is not communicatively connected to the external electronic device, and an event occurs via, within or in relation to an application capable of interoperating with the external electronic device, the electronic device may produce, based on locally-detected information (e.g., step count information detected by the local electronic device), an execution screen 720 of the application (e.g., a health care application) in which the event occurs.

According to an embodiment, the electronic device 101 may thus provide a simulation 720 of a home screen of the external electronic device while communicative connection is not established between the two devices.

Accordingly, by displaying, in the form of a widget, a simulated screen for the external electronic device 104 in the shape of the display of the external electronic device 104, the electronic device 101 simulate the experience of using the external electronic device 104 via the electronic device 101 even when the electronic device 101 and the external electronic device 104 are not communicatively connected.

Figure 8:
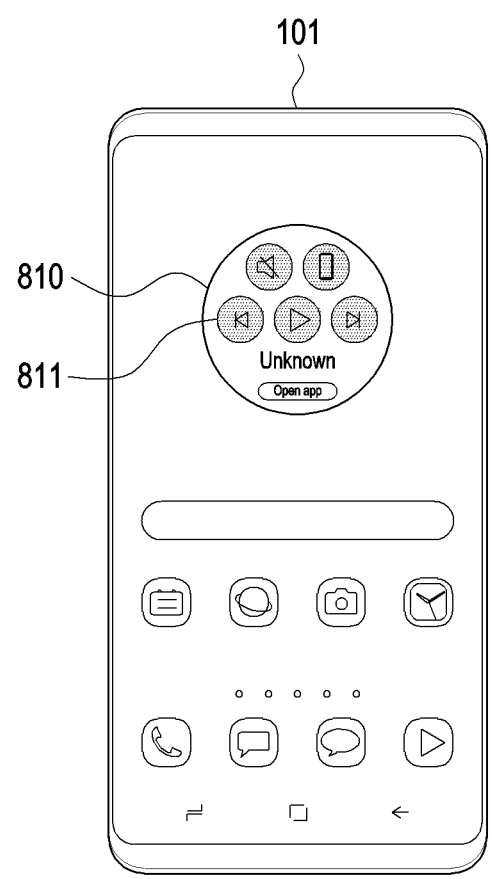
FIG. 8 is a diagram illustrating a widget including a user interface for controlling an electronic device or an external electronic device according to an embodiment.

FIG. 8 is a diagram illustrating a widget including a user interface for controlling an electronic device or an external electronic device according to an embodiment.

According to an embodiment, referring to FIG. 8, the electronic device 101 (e.g., the electronic device 101 of FIG. 1, the processor 120 of FIG. 1, or the electronic device 101 of FIG. 2) may display a screen 810 related to an external electronic device (e.g., the electronic device 104 of FIG. 1 or the external electronic device 104 of FIG. 2) in the form of a widget in a partial area of a display (e.g., the display module 160 of FIG. 1). For example, the screen 810 related to the external electronic device may be configured based on the shape of the display of the external electronic device.

According to an embodiment, the screen 810 related to the external electronic device may include at least one user interface (UI) 811 for controlling some function(s) of at least one of the electronic device 101 or the external electronic device.

According to an embodiment, in the case in which communication between the electronic device 101 and the external electronic device is established, if the electronic device 101 receives a user input selecting at least one element or icon from the user interface 811, the electronic device 101 may detect that an event occurs, control the electronic device 101 based on the selected UI element, and may transmit a control command to the external electronic device to cause the corresponding function to be executed.

For example, if a music reproduction application is executed, the electronic device 101 may display, in the form of a widget, the screen 810 that is related to the external electronic device and includes at least one user interface 811 capable of controlling the music reproduction application. According to an embodiment, if a user input that selects one of the at least one user interface 811 capable of controlling the music reproduction application is received, the electronic device 101 may change, based on the selected user interface, the screen 810 that is related to the external electronic device and includes the at least one user interface 811 into the execution screen of the music reproduction application. According to an embodiment, if the communication with the external electronic device is connected, the electronic device 101 may transmit a control command to the external electronic device so that the external electronic device displays, based on the selected user interface, the execution screen of the music reproduction application.

According to an embodiment, in the case in which communication between the electronic device 101 and the external electronic device is not connected, if the electronic device 101 receives a user input that selects the at least one user interface 811, the electronic device 101 may control the electronic device 101 based on the selected user interface. According to an embodiment, if communication with the external electronic device is connected after controlling the electronic device 101 based on the selected user interface, the electronic device 101 may transmit a control command to the external electronic device so that the external electronic device is controlled based on the selected user interface.

Figure 9A:
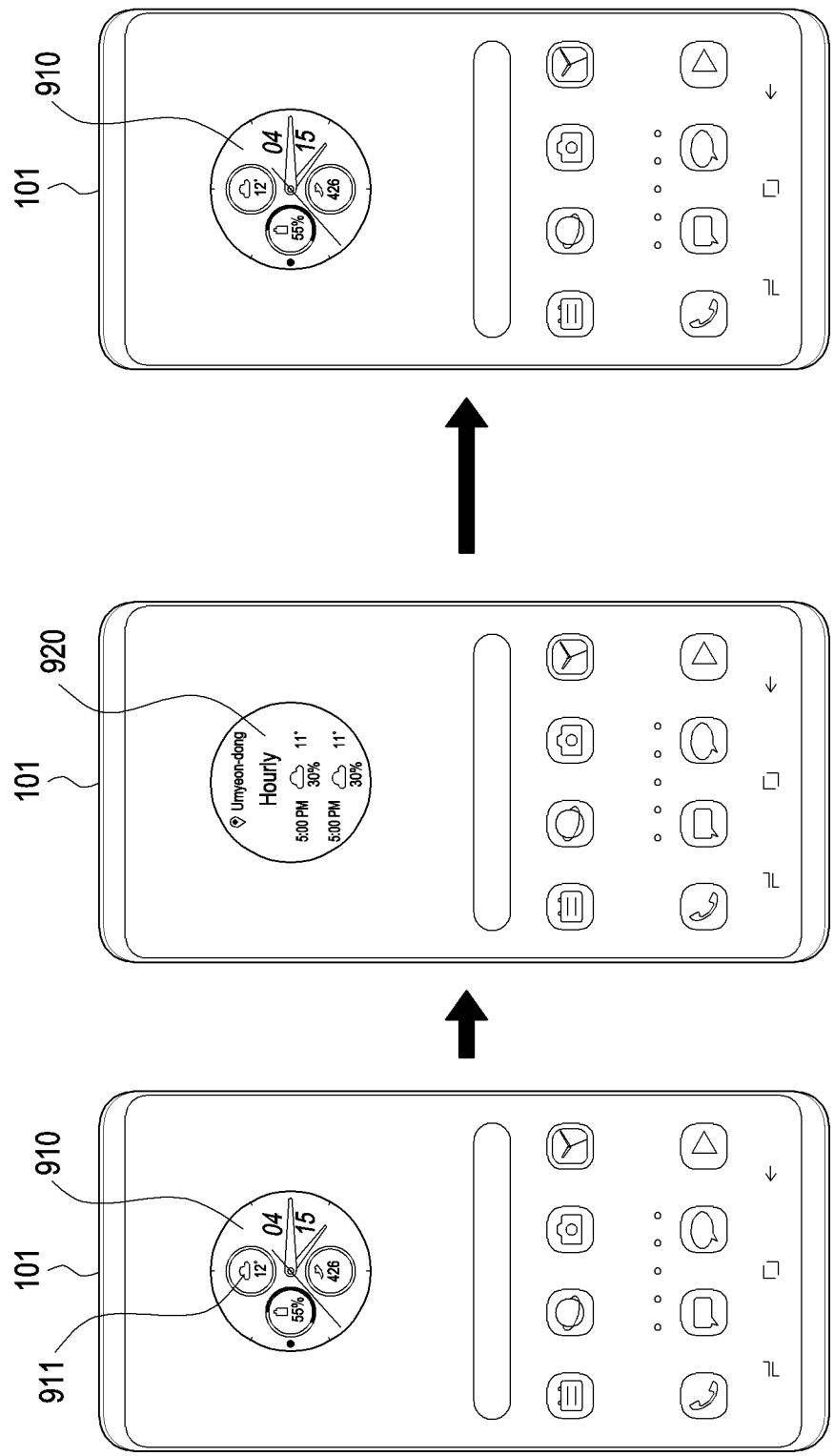
FIG. 9A is a diagram illustrating an operation of an electronic device when a user input is received via a user interface according to an embodiment.

FIG. 9A is a diagram illustrating an operation of an electronic device when a user input is received via a user interface according to an embodiment.

According to an embodiment, referring to FIG. 9A, the electronic device 101 (e.g., the electronic device 101 of FIG. 1, the processor 120 of FIG. 1, or the electronic device 101 of FIG. 2) may display a screen 910 mirroring that of an external electronic device (e.g., the electronic device 104 of FIG. 1 or the external electronic device 104 of FIG. 2) in the form of a widget in a partial area of a display (e.g., the display module 160 of FIG. 1). For example, the screen 910 related to the external electronic device may be configured to have the shape of the display of the external electronic device of the electronic device 101, and may be displayed in the form of a widget in a partial area of a home screen.

According to an embodiment, the screen 910 related to the external electronic device may include at least one user interface 911 for controlling at least one of the electronic device 101 or the external electronic device. For example, referring to FIG. 9A, the screen 910 related to the external electronic device may correspond to a home screen of the external electronic device, and the at least one user interface 911 of the same may include user interface displays related to a weather application, a battery application, and a health care application.

According to an embodiment, if a user input selecting the weather application from among the UIs 911 is received, the electronic device 101 may change the screen 910 to an execution screen 920 of the weather application.

According to an embodiment, if a user input selecting the weather application is not received within a predetermined time after a time at which the execution screen 920 of the weather application is initially displayed in the form of a widget, the electronic device 101 may revert the execution screen 920 of the weather application to the home screen of the external electronic device.

According to an embodiment, if the external electronic device is communicatively connected, the electronic device 101 may transmit a control command to the external electronic device, such that the external electronic device executes the corresponding functions so as to match changes in the screen 910 seen on the local electronic device 101.

Figure 9B:
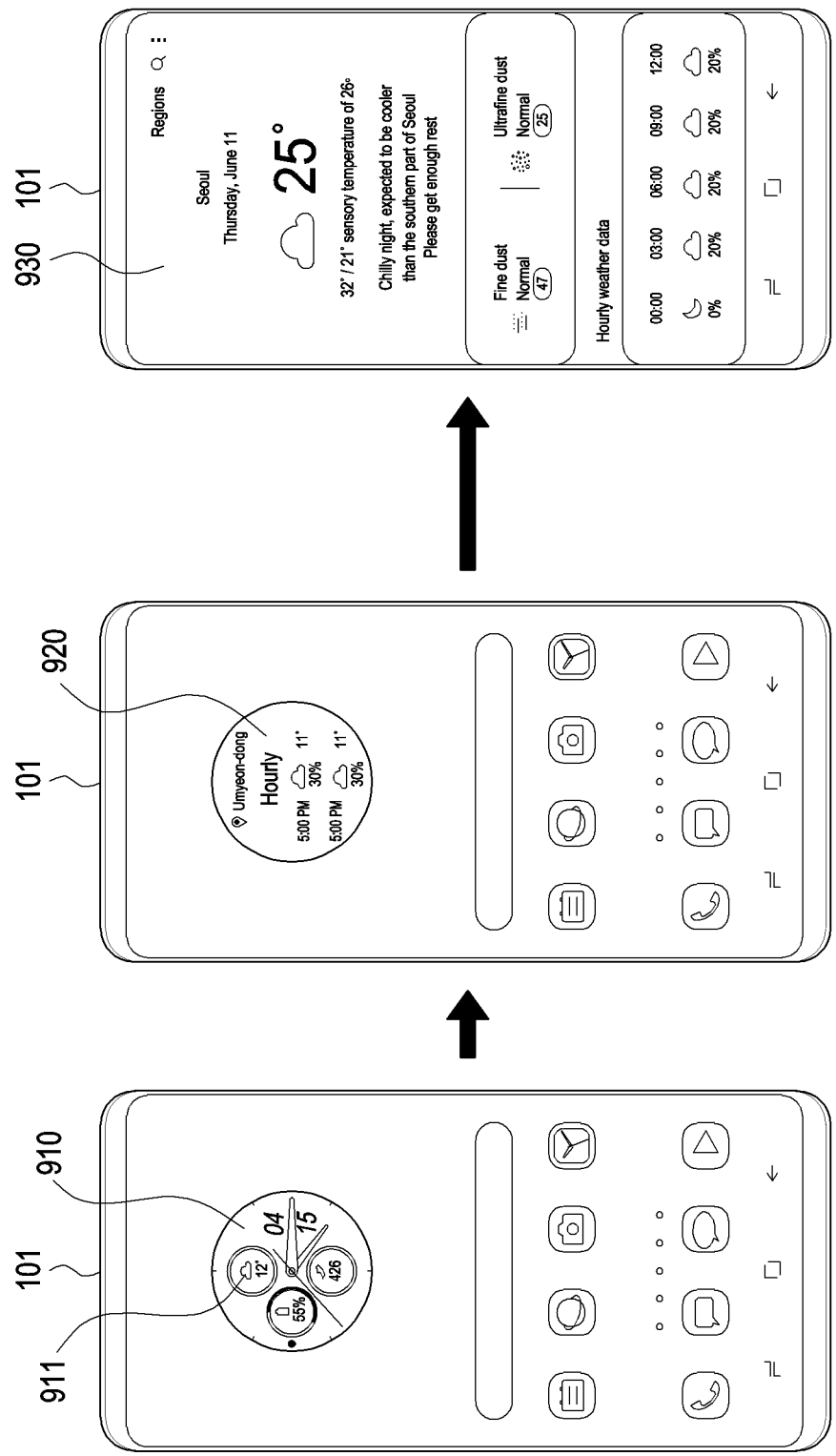
FIG. 9B is a diagram illustrating an operation of an electronic device when a user input is received via a user interface according to an embodiment.

FIG. 9B is a diagram illustrating an operation of an electronic device when a user input is received via a user interface according to an embodiment.

According to an embodiment, referring to FIG. 9B, if a user input is received selecting a weather application from among the user interfaces 911 included in the screen 910 mirroring an external electronic device (e.g., the electronic device 104 of FIG. 1 or the external electronic device 104 of FIG. 2), as illustrated in FIG. 9A, an electronic device (e.g., the electronic device 101 of FIG. 1, the processor 120 of FIG. 1, or the electronic device 101 of FIG. 2) may change the screen 910 mirroring a home screen of the external electronic device to the execution screen 920 of the weather application.

According to an embodiment, if a user input selecting the execution screen 920 of the weather application is received within a predetermined time after the execution screen 920 of the weather application is initially displayed in the form of a widget, the electronic device 101 may display an execution screen 930 of the weather application on an entire area of a display (e.g., the display module 160 of FIG. 1). For example, the electronic device 101 may change a home screen of the electronic device 101 including the execution screen 920 of the weather application displayed in the form of a widget to the execution screen 930 of the weather application.

Figure 10A:
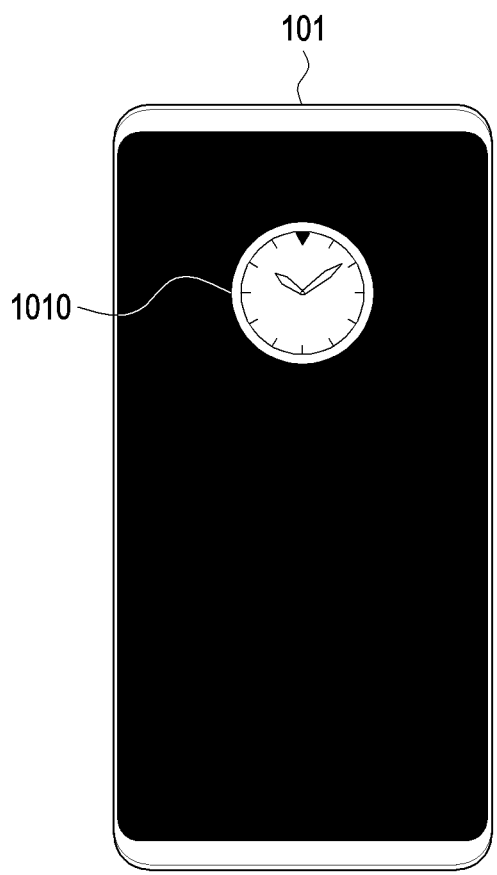
FIG. 10A is a diagram illustrating an operation of displaying a widget in a lock screen of an electronic device according to an embodiment.

FIG. 10A is a diagram illustrating an operation of displaying a widget in a lock screen of an electronic device according to an embodiment.

According to an embodiment, referring to FIG. 10A, the electronic device 101 (e.g., the electronic device 101 of FIG. 1, the processor 120 of FIG. 1, or the electronic device 101 of FIG. 2) may display a screen 1010 related to an external electronic device (e.g., the electronic device 104 of FIG. 1 or the external electronic device 104 of FIG. 2) in the form of a widget in a partial area of a display (e.g., the display module 160 of FIG. 1). For example, the screen 1010 related to the external electronic device may be configured based on the shape of the display of the external electronic device of the electronic device 101, and may be displayed in the form of a widget in a partial area of a lock screen of the electronic device 101. According to an embodiment, the screen 1010 related to the external electronic device may be a screen corresponding to a home screen of the external electronic device.

Figure 10B:
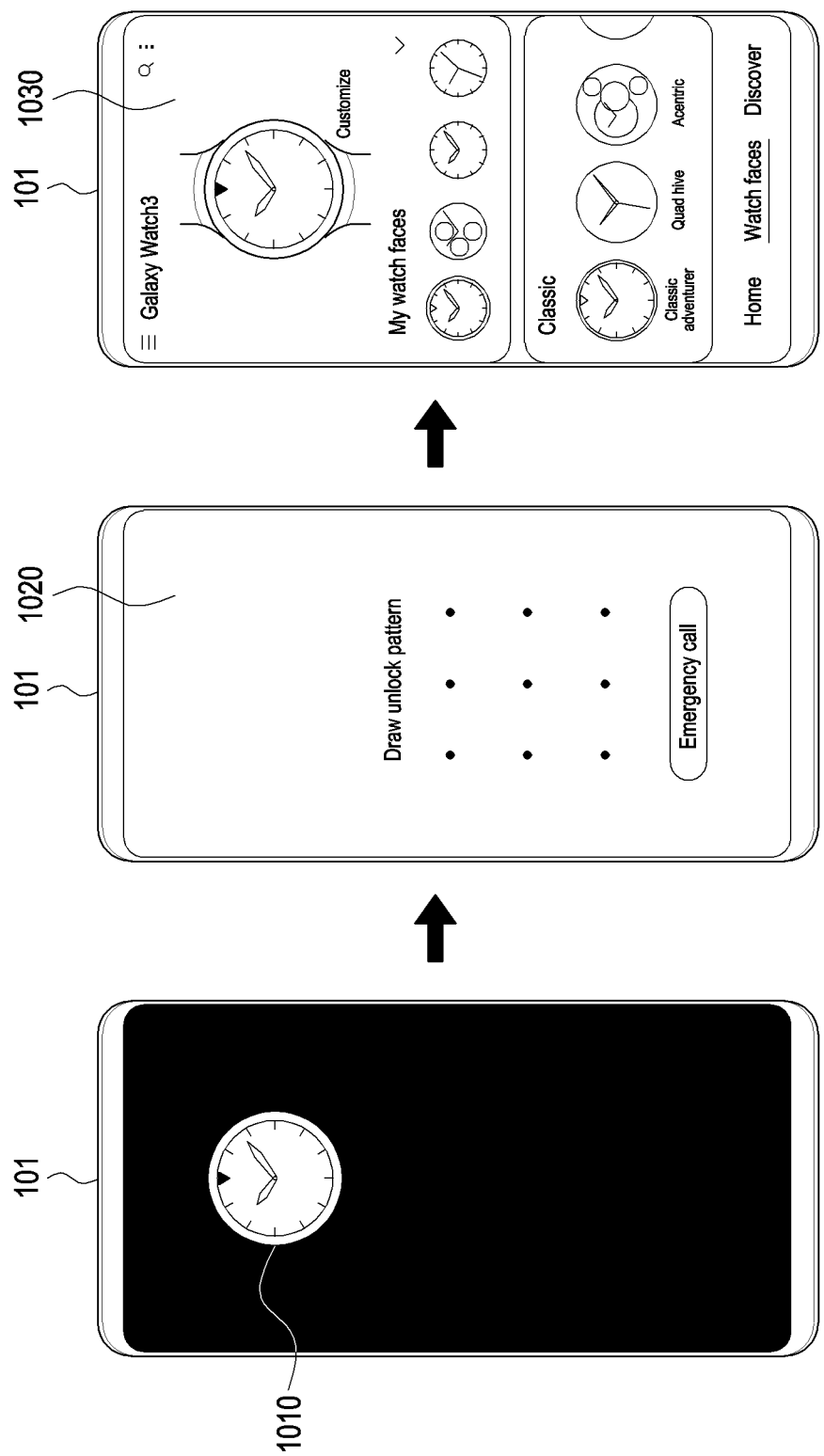
FIG. 10B is a diagram illustrating an operation of displaying a widget in a lock screen of an electronic device according to an embodiment.

FIG. 10B is a diagram illustrating an operation of displaying a widget in a lock screen of an electronic device according to an embodiment.

According to an embodiment, referring to FIG. 10B, if a user input is received selecting the screen 1010 related to an external electronic device (e.g., the electronic device 104 of FIG. 1 or the external electronic device 104 of FIG. 2) displayed in the form of a widget in a part of a lock screen, the electronic device 101 (e.g., the electronic device 101 of FIG. 1, the processor 120 of FIG. 1, or the electronic device 101 of FIG. 2) may unlock the lock screen, and display an application execution screen related to the mirror screen 1010 of the external electronic device.

For example, if the device is so configured such that security information (e.g., biometric information, passwords, or a pattern) must to be input in order to unlock the lock screen of the electronic device 101, and a user input selecting the mirror screen 1010 related to the external electronic device (e.g., the clock) is received, the electronic device 101 may change the lock screen to a security information input screen 1020. According to an embodiment, if security information is input via the security information input screen 1020 and the lock screen is successfully unlocked, the electronic device 101 may display an execution screen 1030 of an application allowing configuring of the settings of the clock screen.

According to an embodiment, if security information is not required to unlock the lock screen, and a user input is received that selects the screen 1010 that is related to the external electronic device and is a clock screen, the electronic device 101 may display the execution screen 1030 of the application capable of changing the settings of the clock screen.

Figure 11A:
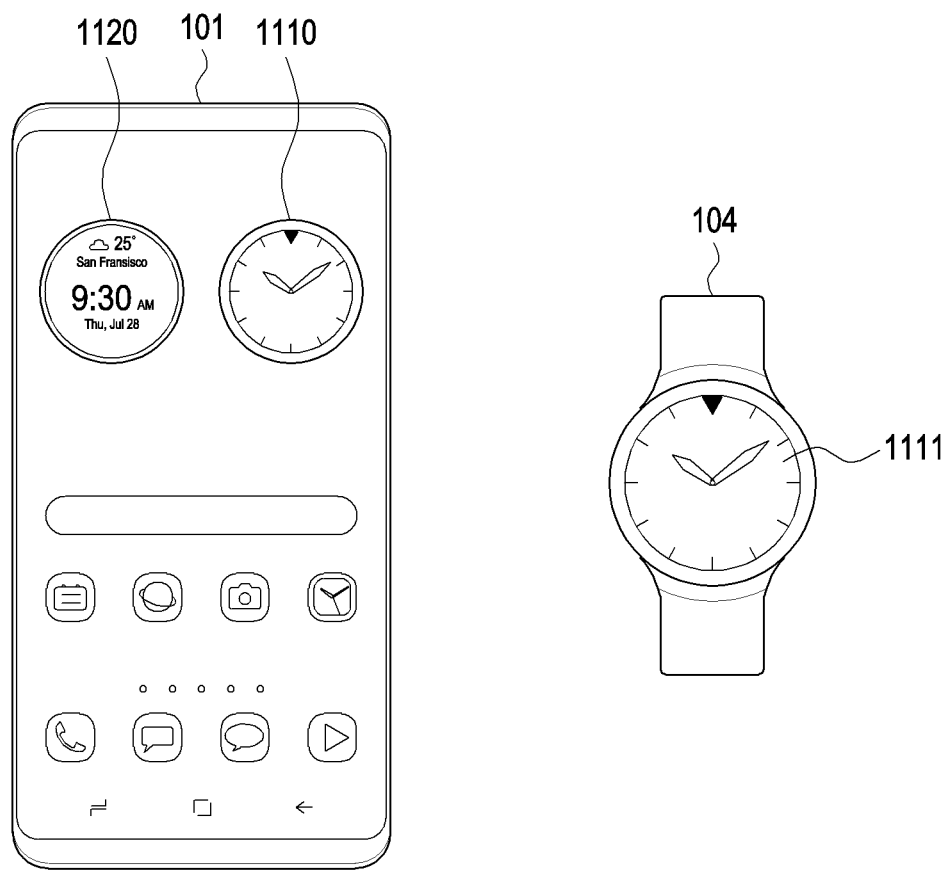
FIG. 11A is a diagram illustrating an operation of an electronic device and an external electronic device when a widget including a plurality of areas is displayed according to an embodiment.

FIG. 11A is a diagram illustrating an operation of an electronic device and an external electronic device when a widget including a plurality of areas is displayed according to an embodiment.

According to an embodiment, referring to FIG. 11A, the electronic device 101 (e.g., the electronic device 101 of FIG. 1, the processor 120 of FIG. 1, or the electronic device 101 of FIG. 2) may display a screen related to the external electronic device 104 (e.g., the electronic device 104 of FIG. 1 or the external electronic device 104 of FIG. 2) in the form of a widget in a partial area of a display (e.g., the display module 160 of FIG. 1).

According to an embodiment, the screen related to the external electronic device 104 may include a first area 1110 that may display a home screen 1111 of the external electronic device 104 and a second area 1120 that displays screens that are generated as events occur and are detected. According to an embodiment, the first area 1110 and the second area 1120 may be generated to have the shape of the display of the external electronic device 104. According to an embodiment, according to the settings by a user, the screen related to the external electronic device 104 may include a plurality of areas including the first area 1110 and the second area 1120. Although FIG. 11A illustrates that the screen related to the external electronic device 104 includes two areas, this is not limited thereto, and may include three or more areas according to an embodiment. Although FIG. 11A illustrates that the first area 1110 is disposed on the right of the second area 1120, this is not limited thereto, and may be changed depending on settings by a user.

According to an embodiment, the first area 1110 may correspond to the home screen 1111 of the external electronic device 104, and may be obtained based on information associated with the home screen 1111 of the external electronic device 104 received from the external electronic device 104, and the second area 1120 may be a screen set by a user.

Although FIG. 11A illustrates that the external electronic device 104 is communicatively connected, the first area 1110 may be obtained based on the settings by a user or based on the information associated with the home screen 1111 of the external electronic device 104 received in a previous connection even in the state in which the external electronic device 104 is not communicatively connected.

Figure 11B:
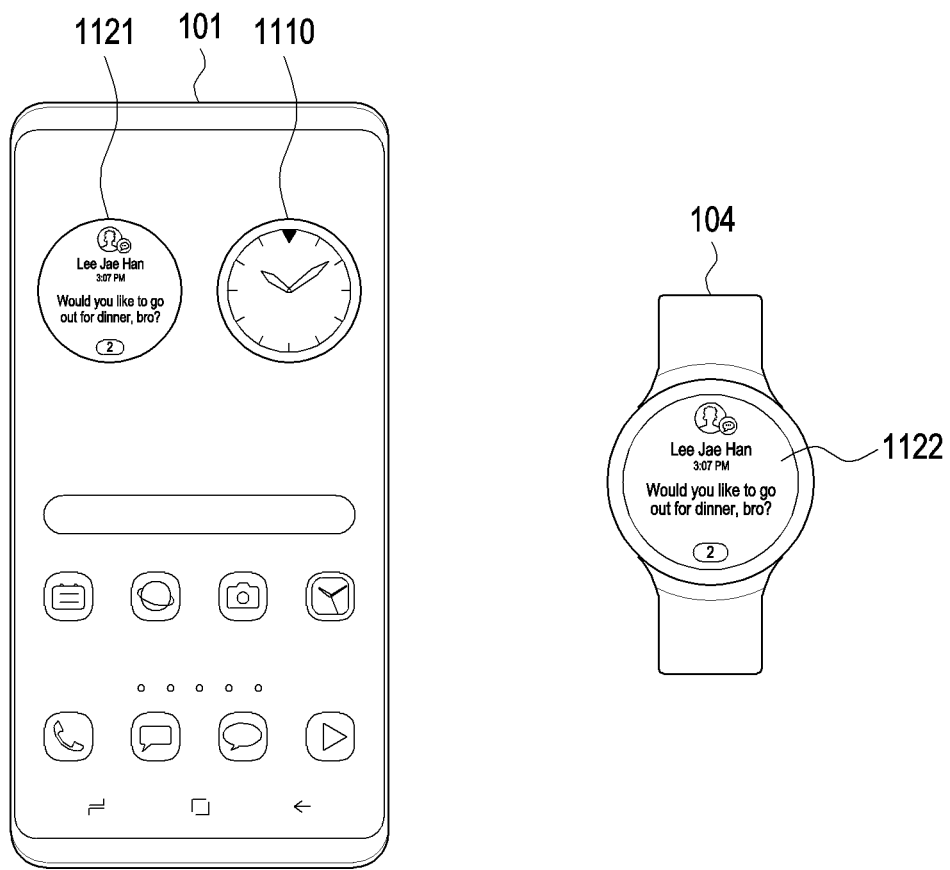
FIG. 11B is a diagram illustrating an operation of an electronic device and an external electronic device when a widget including a plurality of areas is displayed according to an embodiment.

According to an embodiment, if an event occurs, the electronic device 101 may change the second area 1120 to the execution screen of an application where the event occurs, as illustrated in FIG. 11B.

FIG. 11B is a diagram illustrating an operation of an electronic device and an external electronic device when a widget including a plurality of areas is displayed according to an embodiment.

According to an embodiment, referring to FIG. 11B, if an event occurs, the electronic device 101 may change the second area 1120 of FIG. 11A to the execution screen 1121 of an application when a defined event occurs. According to an embodiment, the first area 1110 may be maintained as the home screen of the external electronic device 104, irrespective of the occurrence of an event.

For example, the event may include reception of information from an external server via an application capable of interoperating with the external electronic device 104, arrival of a time corresponding to a schedule event stored in an application capable of interoperating with the external electronic device 104, and/or obtainment of information via a sensor included in the electronic device 101 related to an application capable of interoperating with the external electronic device 104. The electronic device 101 may identify that an event occurs via the application capable of interoperating with the external electronic device 104.

According to an embodiment, if information associated with an event that occurs in an application of the external electronic device 104 is received from the external electronic device 104, the electronic device 101 may identify that an event occurs.

According to an embodiment, the electronic device 101 and the external electronic device 104 may mutually synchronize with information associated with the occurrence of the event, the electronic device 101 may change the second area 1120 of FIG. 11A to the execution screen 1121 of an application where the event occurs, and the external electronic device 104 may change the home screen 1111 of FIG. 11A to the execution screen 1122 of the application where the event occurs.

Figure 12A:
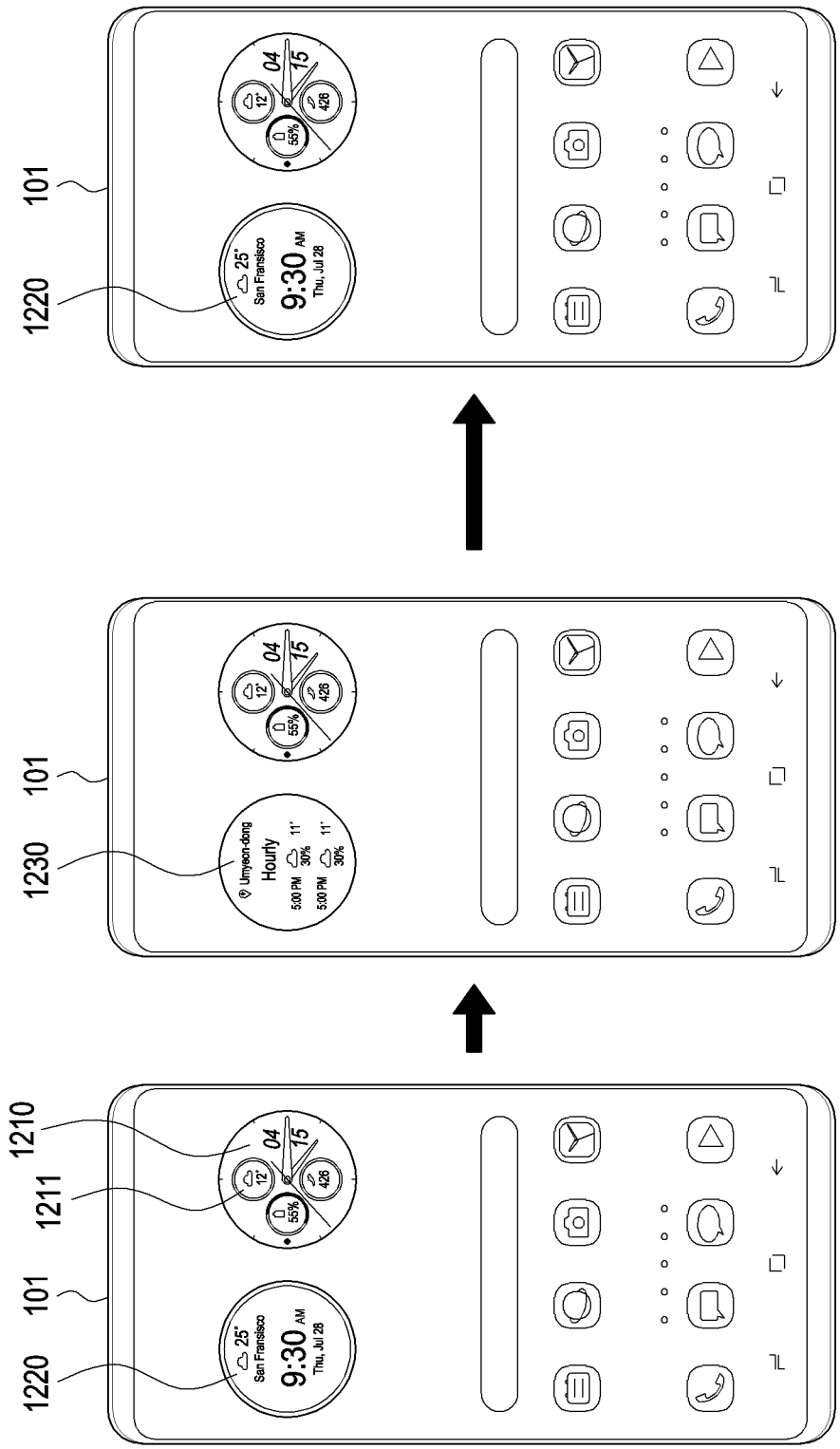
FIG. 12A is a diagram illustrating an operation of an electronic device and an external electronic device when a widget including a plurality of areas is displayed according to an embodiment.

FIG. 12A is a diagram illustrating an operation of an electronic device and an external electronic device when a widget including a plurality of areas is displayed according to an embodiment.

According to an embodiment, referring to FIG. 12A, the electronic device 101 (e.g., the electronic device 101 of FIG. 1, the processor 120 of FIG. 1, or the electronic device 101 of FIG. 2) may display a screen mirroring screen of an external electronic device (e.g., the electronic device 104 of FIG. 1 or the external electronic device 104 of FIG. 2) in the form of a widget in a partial area of a display (e.g., the display module 160 of FIG. 1).

According to an embodiment, the screen mirroring the external electronic device may include a first area 1210 displaying a home screen of the external electronic device, and a second area 1220 displaying screens that are produced as events occur and are detected. According to an embodiment, the first area 1210 and the second area 1220 may be obtained based the shape of the display of the external electronic device.

According to an embodiment, the first area 1210 may display the home screen of the external electronic device, and the second area 1220 may be display a screen set or selected by a user.

According to an embodiment, the screen that corresponds to the home screen of the external electronic device and is displayed in the first area 1210 may include at least one user interface 1211 for controlling at least one of the electronic device 101 or the external electronic device. For example, referring to FIG. 12A, the at least one user interface 1211 may be a user interface related to a weather application, a battery application, and a health care application.

According to an embodiment, if a user input is received selecting the user interface related to the weather application from the at least one user interface 1211, the electronic device 101 may change the second area 1220 to an execution screen 1230 of the weather application.

According to an embodiment, if a user input that selects the execution screen 1230 of the weather application is not received within a predetermined time after the execution screen 1230 of the weather application is initial displayed in the form of a widget, the electronic device 101 may change the execution screen 1230 of the weather application again to a screen set by a user for the second area 1220.

According to an embodiment, if the external electronic device is connected, the electronic device 101 may transmit a control command to the external electronic device so that the external electronic device also displays a corresponding display screen, every time that the screen of the second area 1220 is changed. According to an embodiment, if the screen set by the user is displayed in the second area 1220, the electronic device 101 may transmit a control command to the external electronic device so that a home screen that is a screen corresponding to the first area 1210 is displayed in the external electronic device.

Figure 12B:
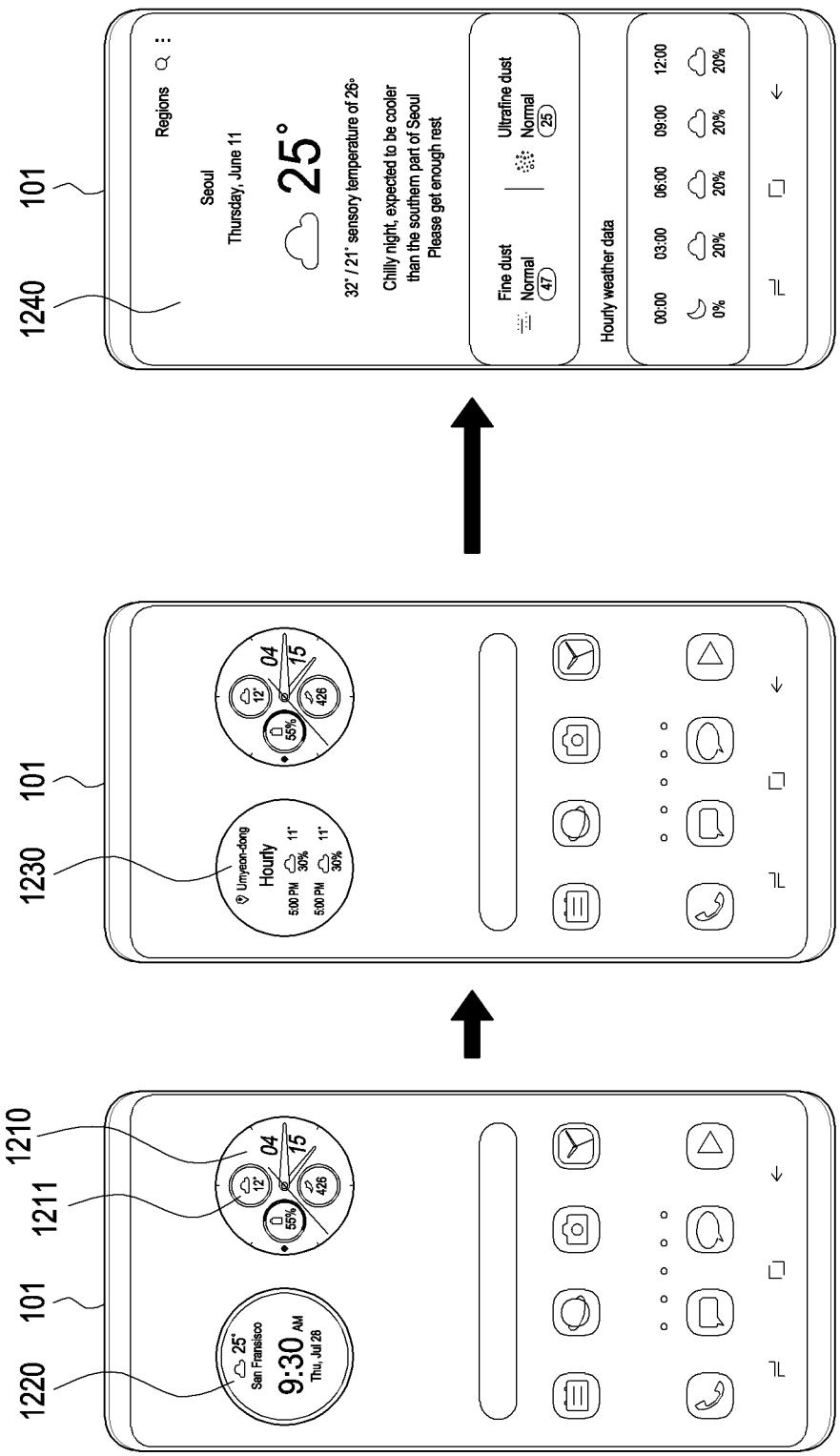
FIG. 12B is a diagram illustrating an operation of an electronic device and an external electronic device when a widget including a plurality of areas is displayed according to an embodiment.

FIG. 12B is a diagram illustrating an operation of an electronic device and an external electronic device when a widget including a plurality of areas is displayed according to an embodiment.

According to an embodiment, referring to FIG. 12B, if a user input is received selecting a user interface element related to a weather application from the user interface 1211 included in the first area 1210 in which the home screen of the external electronic device is displayed (e.g., the electronic device 104 of FIG. 1 or the external electronic device 104 of FIG. 2), as illustrated in FIG. 11A, the electronic device 101 (e.g., the electronic device 101 of FIG. 1, the processor 120 of FIG. 1, or the electronic device 101 of FIG. 2) may change the second area 1220 to the execution screen 1230 of the weather application.

According to an embodiment, if a user input that selects the execution screen 1230 of the weather application is received within a predetermined time after the execution screen 1230 of the weather application is initially displayed in the form of a widget, the electronic device 101 may display an execution screen 1240 of the weather application on the entire area of a display (e.g., the display module 160 of FIG. 1). For example, the electronic device 101 may change a home screen of the electronic device 101, including the execution screen 1230 of the weather application as displayed in the form of a widget, to the full-screen execution screen 1240 of the weather application.

Figure 13A:
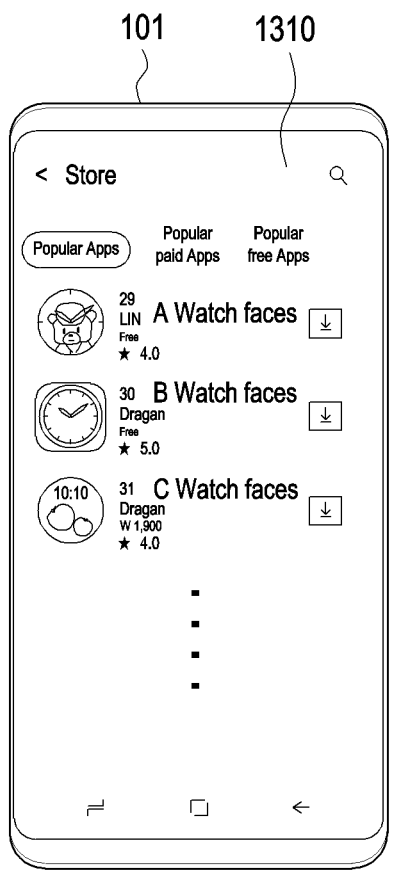
FIG. 13A is a diagram illustrating an embodiment of using an application of an external electronic device via an electronic device according to an embodiment.

FIG. 13A is a diagram illustrating an embodiment of using an application of an external electronic device via an electronic device according to an embodiment.

According to an embodiment, referring to FIG. 13A, the electronic device 101 (e.g., the electronic device 101 of FIG. 1, the processor 120 of FIG. 1, or the electronic device 101 of FIG. 2) may download, from an external server, information related to the design of a home screen of an external electronic device (e.g., the electronic device 104 of FIG. 1 or the external electronic device 104 of FIG. 2).

For example, the electronic device 101 may display a design list 1310 of the home screen of the external electronic device provided from an external server, and may download the design (e.g., A Watch faces) of the home screen of the external electronic device selected by a user input.

According to an embodiment, the design of the home screen of the external electronic device that the electronic device 101 downloads may correspond to the shape of the display of the external electronic device, and may be different from the shape of the display (e.g., the display module 160 of FIG. 1) of the electronic device 101.

Figure 13B:
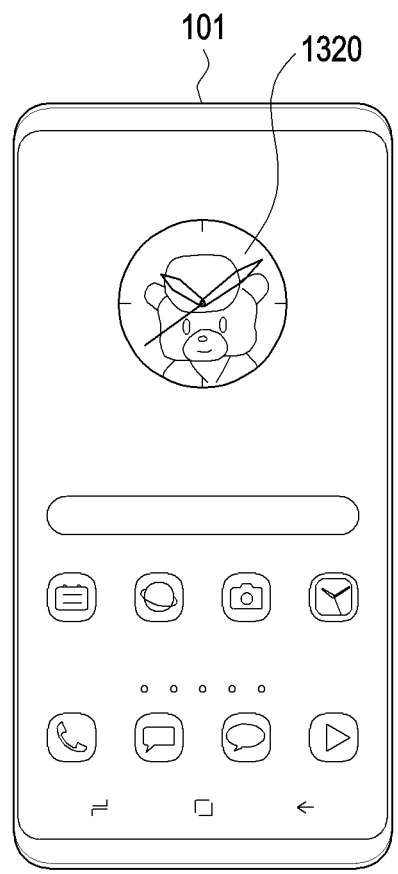
FIG. 13B is a diagram illustrating an embodiment of using an application of an external electronic device via an electronic device according to an embodiment.

According to an embodiment, if the electronic device 101 may be configured to display a screen related to the external electronic device in the form of a widget, and downloads the design of the home screen of the external electronic device, the electronic device 101 may apply the downloaded design of the home screen of the external electronic device to the screen related to the external electronic device, as illustrated in FIG. 13B.

FIG. 13B is a diagram illustrating an embodiment of using an application of an external electronic device via an electronic device according to an embodiment.

According to various embodiment, referring to FIG. 13B, the electronic device 101 may change, to a downloaded design (e.g., A Watch faces), the design of a screen 1320 related to the external electronic device that is displayed in the form of a widget in a partial area of a display (e.g., the display module 160 of FIG. 1).

According to an embodiment, if the electronic device 101 is in the state of being connected to the external electronic device for communication, the electronic device 101 may transmit the downloaded information related to the design of a home screen of the external electronic device to the external electronic device so that the external electronic device changes the design of the home screen to the downloaded design.

Figure 13C:
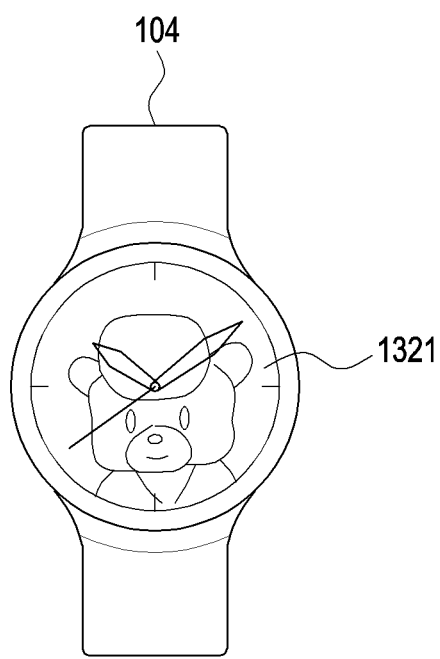
FIG. 13C is a diagram illustrating an operation of an external electronic device when an electronic device operates as illustrated in FIG. 13B.

FIG. 13C is a diagram illustrating an operation of an external electronic device when an electronic device operates as illustrated in FIG. 13B.

According to an embodiment, referring to FIG. 13C, the external electronic device 104 (e.g., the electronic device 104 of FIG. 1 or the external electronic device 104 of FIG. 2) may receive design information related to a home screen from the electronic device, and may change the design of a home screen 1321 to the received design (e.g., A Watch faces).

As described above, the electronic device may display a screen related to the external electronic device in the form of a widget, thereby enabling an application of the external electronic device to be used via the electronic device.

Figure 14:
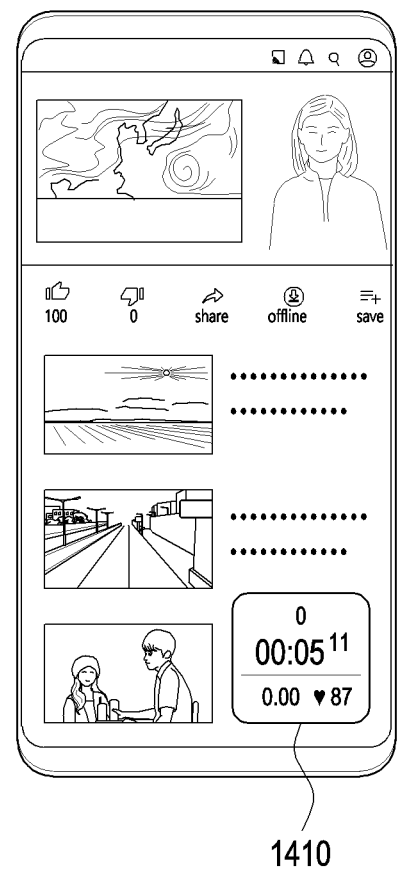
FIG. 14 is a diagram illustrating an embodiment in which the screen of an external electronic device of an electronic device is displayed in the form of a popup according to an embodiment.

FIG. 14 is a diagram illustrating an embodiment in which the screen of an external electronic device of an electronic device is displayed in the form of a popup according to an embodiment.

According to an embodiment, referring to FIG. 14, an electronic device (e.g., the electronic device 101 of FIG. 1, the processor 120 of FIG. 1, or the electronic device 101 of FIG. 2) may display a screen related to an external electronic device (e.g., the electronic device 104 of FIG. 1 or the external electronic device 104 of FIG. 2) in the form of a popup. For example, the electronic device may display a screen 1410 related to the external electronic device in the form of a popup in a part of an application execution screen of the electronic device. According to an embodiment, the electronic device 101 may display, based on user settings, the screen 1410 related to the external electronic device in the form of a widget or a popup.

According to an embodiment, referring to FIG. 14, if an electronic device executes a timer application in a connected external electronic device, while executing a video reproduction application, the electronic device may display the screen 1410 that is related to the external electronic device and is the execution screen of the timer application in the form of a popup in a video reproduction application screen.

According to an embodiment, the screen 1410 related to the external electronic device may be configured based on the shape of the display of the external electronic device. For example, the screen 1410 related to the external electronic device may be obtained in the shape that is the same as the shape of the display of the external electronic device, or may be obtained in a different shape by changing the boundary of the shape of the display of the external electronic device. For example, if the shape of the display of the external electronic device is a circular shape, the electronic device may obtain the screen 1410 related to the external electronic device provided in a square shape by changing the boundary of the circular shape.

Accordingly, the electronic device may provide a user with an experience of using the external electronic device via the electronic device.

According to an embodiment, an electronic device may include a memory, a display, and at least one processor operatively connected to the memory and the display, in which the at least one processor is configured to display a first screen related to an external electronic device in the form of a widget in at least a partial area of the display, to obtain a second screen based on information related to an event if the event occurs via at least one application capable of interoperating with the external electronic device among a plurality of applications stored in the memory, and to change the first screen to the second screen.

According to an embodiment, the shape of at least one of the first screen or the second screen may be obtained based on the shape of a display of the external electronic device.

According to an embodiment, the electronic device may further include a communication module, and the at least one processor is configured to receive information related to a home screen of the external electronic device via the communication module, and to obtain the first screen based on the information related to the home screen.

According to an embodiment, the at least one processor may be configured to identify that the event occurs if receiving information related to the at least one application from the external electronic device via the communication module, and to obtain the second screen based on the received information related to the at least one application and information stored in the memory.

According to an embodiment, the at least one processor may be configured to obtain a third screen based on the information stored in the memory if communication with the external electronic device is disconnected, and to change the second screen to the third screen.

According to an embodiment, the at least one processor may be configured to transmit a control command to the external electronic device so that the external electronic device displays a screen corresponding to the third screen if communication with the external electronic device is reconnected.

According to an embodiment, the at least one processor may be configured to identify that the event occurs if receiving information related to an application different from the plurality of applications stored in the memory from the external electronic device via the communication module, to obtain the second screen based on the information related to the received different application and the information stored in the memory, to obtain a third screen based on information associated with an application that is most similar to the different application among the plurality of applications stored in the memory if communication with the external electronic device is disconnected, and to change the second screen to the third screen.

According to an embodiment, the electronic device may further include a communication module, in which the at least one processor may be configured to obtain the second screen based on information related to the event if obtaining the information related to the event via the at least one application, and to transmit the information related to the event to the external electronic device via the communication module.

According to an embodiment, the electronic device may further include a communication module, in which the first screen may include at least one user interface related to at least one application, and the at least one processor may be configured to identify that the event occurs if receiving a user input that selects one of the at least one user interface, to obtain the second screen that is an execution screen of an application related to the selected user interface, and to transmit a control command to the external electronic device so that the external electronic device displays the execution screen of the application related to the selected user interface.

According to an embodiment, the first screen may include a first area that corresponds to a home screen of the external electronic device and is maintained irrespective of the occurrence of the event, and a second area that is changed based on the occurrence of the event.

According to an embodiment, a control method of an electronic device may include an operation of displaying a first screen related to an external electronic device in the form of a widget in at least a partial area of a display, an operation of obtaining a second screen based on information related to the event if an event occurs via at least one application capable of interoperating with the external electronic device among a plurality of applications stored in a memory of the electronic device, and an operation of changing the first screen to the second screen.

According to an embodiment, the shape of at least one of the first screen or the second screen may be obtained based on the shape of a display of the external electronic device.

According to an embodiment, the method may further include an operation of receiving information related to a home screen of the external electronic device, and an operation of obtaining the first screen based on the information related to the home screen.

According to an embodiment, the operation of obtaining the second screen may include an operation of identifying that the event occurs if receiving information related to the at least one application from the external electronic device, and an operation of obtaining the second screen based on the received information related to the at least one application and information stored in the memory.

According to an embodiment, the method may further include an operation of obtaining a third screen based on the information stored in the memory if communication with the external electronic device is disconnected, and an operation of changing the second screen to the third screen.

According to an embodiment, the method may further include an operation of transmitting a control command to the external electronic device so that the external electronic device displays a screen corresponding to the third screen if communication with the external electronic device is reconnected.

According to an embodiment, the operation of obtaining the second screen may further include an operation of identifying that the event occurs if receiving information related to an application different from the plurality of applications stored in the memory from the external electronic device, and an operation of obtaining the second screen based on the received information associated with the different application and the information stored in the memory, and the method may further include an operation of obtaining a third screen based on information associated with an application that is most similar to the different application among the plurality of applications stored in the memory if communication with the external electronic device is disconnected, and an operation of changing the second screen to the third screen.

According to an embodiment, the operation of obtaining the second screen may include an operation of obtaining the second screen based on information related to the event if the information related to the event is obtained via the at least one application, and the method may further include an operation of transmitting the information related to the event to the external electronic device.

According to an embodiment, the first screen may include at least one user interface related to at least one application, and the operation of obtaining the second screen may include an operation of identifying that the event occurs if a user input that selects one of the at least one user interface is received, and an operation of obtaining the second screen that is an execution screen of an application related to the selected user interface, and the method may include an operation of transmitting a control command to the external electronic device so that the external electronic device displays the execution screen of the application related to the selected user interface.

According to an embodiment, the first screen may include a first area that corresponds to a home screen of the external electronic device and is maintained irrespective of the occurrence of the event, and a second area that is changed based on the occurrence of the event.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   memory;
   a communication module;
   a display; and
   at least one processor,
   wherein the memory stores instructions configured to, when executed by the at least one processor, cause the electronic device to:
   display a first screen corresponding to a first execution screen displayed on an entire area of a display of an external electronic device, for one widget, using at least part of a display area of the display,
   after displaying the first screen, receive a communication from the external electronic device, the communication including information indicating an event occurring at the external electronic device, wherein the event is associated with at least one application capable of interoperating with the external electronic device, wherein the event changes the first execution screen displayed on the external electronic device to a second execution screen of the at least one application displayed on the external electronic device;

in response to receiving the communication indicating the event, generate a second screen corresponding to the second execution screen displayed on the external electronic device, based at least on the information indicating the event, and display the second screen for the one widget using the at least part of the display area of the display, wherein a shape of at least one of the first screen or the second screen corresponds to a physical shape of the display of the external electronic device.

2. The electronic device of claim 1,
wherein the first screen is a mirroring screen of a home screen of the external electronic device that is received via the communication module.

3. The electronic device of claim 2, wherein the second screen is also based on information stored in the memory.

4. The electronic device of claim 3, wherein the memory stores instructions configured to, when executed by the at least one processor, cause the electronic device to:
when communication with the external electronic device is disconnected, generate a third screen based on the information stored in the memory, and
remove display of the second screen and display the third screen on the display.

5. The electronic device of claim 4, wherein the memory stores instructions configured to, when executed by the at least one processor, cause the electronic device to:
after communication with the external electronic device is restored, transmit a control command to the external electronic device to display a screen corresponding to the third screen.

6. The electronic device of claim 2, wherein the memory stores instructions configured to, when executed by the at least one processor, cause the electronic device to detect the event by receiving, from the external electronic device, via the communication module, information related to a uninstalled application, wherein the second screen is retrieved based at least on the information related to the uninstalled application,
based on detecting disconnection of communication with the external electronic device, generate a third screen using a local application stored in the memory identified as being most similar with the uninstalled application; and
remove the second screen and display the third screen on the display.

7. The electronic device of claim 1,
wherein the information related to the indicated event on which obtaining the second screen is based is obtained via the at least one application, and
wherein the information related to the event is transmitted to the external electronic device via the communication module.

8. The electronic device of claim 1,
wherein the first screen includes display of at least one user interface element related to at least one application, wherein the indicated event includes at least one of detecting selection of the at least one user interface element or triggering execution of the at least one application,
wherein the second screen includes an execution screen of the at least one application, and
wherein the memory stores instructions configured to, when executed by the at least one processor, cause the electronic device to:
transmit a control command to the external electronic device to cause the external electronic device to display the execution screen of the at least one application.

9. The electronic device of claim 1, wherein the first screen further includes:
a first area corresponding to a home screen of the external electronic device, the first area maintained for display irrespective of detecting the event, and
a second area for which display is changed based on detecting the event.

10. A method for controlling an electronic device, the method comprising:
displaying, via a display of the electronic device, a first screen corresponding to a first execution screen displayed on an entire area of a display of an external electronic device, for one widget, using at least a part of a display area of the display the electronic device;
after displaying the first screen, receiving a communication from the external electronic device, the communication including information indicating an event occurring at the external electronic device, wherein the event is associated with at least one application capable of interoperating with the external electronic device, wherein the event changes the first execution screen displayed on the external electronic device to a second execution screen of the at least one application displayed on the external electronic device;
in response to receiving the communication indicating the event, generating a second screen corresponding to the second execution screen displayed on the external electronic device, based at least on the information indicating the event; and
displaying the second screen as the one widget using the at least part of the display area of the display,
wherein a shape of at least one of the first screen or the second screen corresponds to a physical shape of the display of the external electronic device.

11. The method of claim 10, wherein the first screen is a mirroring screen of a home screen of the external electronic device that is received via a communication module.

12. The method of claim 11, wherein the second screen is also based on information stored in a memory.

13. The method of claim 12, further comprising:
when communication with the external electronic device is disconnected, generating a third screen based on the information stored in the memory, and
removing display of the second screen and display the third screen on the display.

14. The method of claim 13, further comprising:
after communication with the external electronic device is restored, transmitting a control command to the external electronic device to display a screen corresponding to the third screen.

15. The method of claim 11, wherein detecting the event further includes receiving, from the external electronic device, via the communication module, information related to a uninstalled application, wherein the second screen is retrieved based at least on the information related to the uninstalled application, based on detecting disconnection of communication with the external electronic device, generating a third screen using a local application stored in a memory identified as being most similar with the uninstalled application; and removing the second screen and displaying the third screen on the display.

16. The method of claim 10, wherein the information related to the indicated event on which obtaining the second screen is based is obtained via the at least one application, and wherein the information related to the event is transmitted to the external electronic device via a communication module.

17. The method of claim 10, wherein the first screen includes display of at least one user interface element related to at least one application, wherein the indicated event includes at least one of detecting selection of the at least one user interface element or triggering execution of the at least one application, wherein the second screen includes an execution screen of the at least one application, and the method further comprising, transmitting a control command to the external electronic device to cause the external electronic device to display the execution screen of the at least one application via a communication module.

18. The electronic device of claim 1, wherein the memory stores the at least one application, and wherein generating the second screen comprises inputting at least the information indicating the event to the at least one application.

* * * * *